(12) United States Patent
Pennington, III et al.

(10) Patent No.: US 12,199,482 B2
(45) Date of Patent: Jan. 14, 2025

(54) POWER DISTRIBUTION WITHIN AN ELECTRIC MACHINE

(71) Applicant: Tau Motors, Inc., Redwood City, CA (US)

(72) Inventors: Walter Wesley Pennington, III, Menlo Park, CA (US); Matthew J. Rubin, Indianapolis, IN (US); Gregory Gordon Stevenson, San Carlos, CA (US); Michael Parker Owen, St. Augustine, FL (US); Ethan Bagget Swint, Redwood City, CA (US); Matthias Preindl, New York, NY (US)

(73) Assignee: Tau Motors, Inc., Redwood City, CA (US)

( * ) Notice: Subject to any disclaimer, the term of this patent is extended or adjusted under 35 U.S.C. 154(b) by 0 days.

(21) Appl. No.: 18/606,620

(22) Filed: Mar. 15, 2024

(65) Prior Publication Data

US 2024/0213864 A1 Jun. 27, 2024

Related U.S. Application Data

(63) Continuation of application No. 18/332,038, filed on Jun. 9, 2023, now Pat. No. 11,936,255, which is a
(Continued)

(51) Int. Cl.
*H02K 17/32* (2006.01)
*H02K 1/22* (2006.01)
(Continued)

(52) U.S. Cl.
CPC ........... *H02K 21/042* (2013.01); *H02K 1/223* (2013.01); *H02P 21/22* (2016.02); *H02P 25/098* (2016.02)

(58) Field of Classification Search
CPC ....... H02K 21/042; H02K 1/223; H02P 21/22
(Continued)

(56) References Cited

U.S. PATENT DOCUMENTS 7,358,698 B2   4/2008   Seguchi et al.
8,400,088 B2   3/2013   De Belie et al.
(Continued)

FOREIGN PATENT DOCUMENTS

CN   103534913   1/2014
JP   H08-205316   8/1996
(Continued)

OTHER PUBLICATIONS

Office Action in Chinese Appln. No. 202180063065.9, dated Sep. 4, 2024, 11 pages (with English translation).
(Continued)

*Primary Examiner* — Erick D Glass
(74) *Attorney, Agent, or Firm* — Fish & Richardson P.C.

(57) ABSTRACT

An electric machine includes a stator and a rotor energizable by magnetic fields produced by the stator when receiving a stator current to produce relative motion between the rotor and the stator. A controller is configured to send the stator current through the stator at a current angle measured from the closest one of a pole of the rotor, determine a desired operational output of the electric machine, and determine a desired rotor motion corresponding to the desired operational output of the electric machine. The controller is further configured to calculate a vector control modulation applied to the stator that elicits the desired rotor motion, and adjust the current angle of the stator current based on the vector control modulation to cause the rotor to perform the desired rotor motion and achieve the desired operational output of the electric machine.

20 Claims, 16 Drawing Sheets

Related U.S. Application Data continuation of application No. 17/634,828, filed as application No. PCT/US2021/044207 on Aug. 2, 2021, now Pat. No. 11,757,338.

(60) Provisional application No. 63/059,929, filed on Jul. 31, 2020.

(51) Int. Cl.
*H02K 21/04* (2006.01)
*H02K 23/68* (2006.01)
*H02K 27/30* (2006.01)
*H02P 21/22* (2016.01)
*H02P 25/098* (2016.01)

(58) Field of Classification Search
USPC .......................................................... 318/433
See application file for complete search history.

(56) References Cited

U.S. PATENT DOCUMENTS

| | | | |
|---|---|---|---|
| 8,847,455 | B2 | 9/2014 | Hiramoto et al. |
| 8,922,087 | B1 | 12/2014 | Rittenhouse |
| 11,637,481 | B1 | 4/2023 | Pennington, III et al. |
| 11,757,338 | B2 | 9/2023 | Pennington, III et al. |
| 11,936,255 | B2 | 3/2024 | Pennington, III et al. |
| 12,003,144 | B2 | 6/2024 | Pennington, III et al. |
| 2004/0135539 | A1 | 7/2004 | Iwashita et al. |
| 2005/0006978 | A1 | 1/2005 | Bradfield |
| 2006/0001392 | A1 | 1/2006 | Ajima et al. |
| 2006/0290316 | A1 | 12/2006 | Seguchi et al. |
| 2009/0296777 | A1* | 12/2009 | Fish ................ H02P 9/302 310/68 C |
| 2010/0026128 | A1 | 2/2010 | Ionel |
| 2010/0259136 | A1 | 10/2010 | Hiramoto et al. |
| 2011/0291599 | A1 | 12/2011 | El-Antably et al. |
| 2012/0242272 | A1 | 9/2012 | Yamada et al. |
| 2012/0268081 | A1 | 10/2012 | Tripathi et al. |
| 2013/0314021 | A1 | 11/2013 | Yamada et al. |
| 2013/0334937 | A1 | 12/2013 | Yamada et al. |
| 2014/0028160 | A1 | 1/2014 | Yamada et al. |
| 2015/0035520 | A1* | 2/2015 | Roesner ............ H02P 6/16 324/207.25 |
| 2015/0091481 | A1* | 4/2015 | Tago ................ H02P 6/28 318/400.2 |
| 2015/0171781 | A1 | 6/2015 | Halkosaari et al. |
| 2018/0048213 | A1 | 2/2018 | Rubin |
| 2019/0158004 | A1 | 5/2019 | Pramod et al. |
| 2019/0207491 | A1 | 7/2019 | Seguchi |
| 2019/0280540 | A1 | 9/2019 | Lindner et al. |
| 2020/0052557 | A1 | 2/2020 | Rubin et al. |
| 2020/0235683 | A1 | 7/2020 | Suzuki et al. |
| 2023/0048207 | A1 | 2/2023 | Mori et al. |
| 2023/0145709 | A1 | 5/2023 | Pennington, III et al. |
| 2023/0148310 | A1 | 5/2023 | Pennington, III et al. |
| 2023/0231444 | A1 | 7/2023 | Pennington, III et al. |
| 2024/0014721 | A1 | 1/2024 | Pennington, III et al. |
| 2024/0204622 | A1 | 6/2024 | Pennington, III et al. |

FOREIGN PATENT DOCUMENTS

| | | |
|---|---|---|
| JP | 2007-185082 | 7/2007 |
| JP | 2008-178166 | 7/2008 |
| JP | 2009-112091 | 5/2009 |
| JP | 2009-290930 | 12/2009 |
| JP | 2012-170252 | 9/2012 |
| KR | 10-2018-0082300 | 7/2018 |

OTHER PUBLICATIONS

Office Action in Japanese Appln. No. 2023-506213, dated Jul. 26, 2024, 7 pages (with English translation).
Office Action in Korean Appln. No. 10-2023-7006614, dated Jul. 25, 2024, 16 pages (with English translation).
Extended European Search Report in European Appln No. 21849219.7, mailed on Jan. 2, 2024, 10 pages.
Extended European Search Report in European Appln No. 21849413.6, mailed on Dec. 12, 2023, 10 pages.
International Search Report and Written Opinion in International Appln. No. PCT/US2021/044207, dated Dec. 7, 2021, 12 pages.
International Search Report and Written Opinion in International Appln. No. PCT/US2021/044213, dated Oct. 28, 2021, 8 pages.
Office Action in Australian Appln. No. 2021318184, dated Aug. 23, 2023, 4 pages.
Office Action in Australian Appln. No. 2021319214, dated Aug. 16, 2023, 3 pages.
Office Action in Canadian Appln. No. 3,190,431, dated Jul. 28, 2023, 3 pages.
Office Action in Chinese Appln. No. 202180063065.9, dated Jun. 18, 2024, 12 pages (with English translation).
Office Action in Chinese Appln. No. 202180063065.9, dated Sep. 29, 2023, 16 pages (with English translation).
Office Action in Japanese Appln. No. 2023-506210, dated Aug. 2, 2023, 15 pages (with English translation).
Office Action in Korean Appln. No. 10-2023-7006572, dated Aug. 11, 2023, 11 pages (with English translation).
Office Action in Australian Appln. No. 2024200951, mailed on Oct. 26, 2024, 3 pages.

\* cited by examiner

POWER DISTRIBUTION WITHIN AN ELECTRIC MACHINE

CLAIM OF PRIORITY

This application is a continuation of U.S. patent application Ser. No. 18/332,038, filed Jun. 9, 2023, which is a continuation of U.S. patent application Ser. No. 17/634,828, filed 11 Feb. 2022, now U.S. Pat. No. 11,757,338, which is a 371 US National phase application of PCT/US2021/044207 filed 2 Aug. 2021, which claims priority under 35 USC § 119(e) to U.S. Patent Application Ser. No. 63/059,929, filed on 31 Jul. 2020, the entire contents of which are hereby incorporated by reference.

TECHNICAL FIELD

This invention relates to electric motors and generators.

BACKGROUND

Electric motors generally comprise a stationary component, often referred to as a stator, and a rotational component often referred to as a rotor. Electric current is translated into electromagnetic fields which exert a mechanical force, or torque, between the stator and the rotor, which may be used to do work. Generators work on similar principles with mechanical force being translated into electric current. While primarily described in terms of rotational force, or torque, the principles described herein are also applicable to linear motors. For linear motors, in some implementations, the rotor acts as the stationary component while the stator acts as a translated component.

SUMMARY

This disclosure describes technologies relating to wirelessly transferring power within an electric machine.

An example implementation of the subject matter described in this disclosure is an electric machine with the following features. A stator defines multiple stator poles with associated stator windings. A rotor defines multiple fixed rotor poles with associated rotor windings. The rotor defines a field energizable by magnetic fields produced by the stator windings to produce relative motion between the rotor and the stator. The rotor is maintained in synchronicity with the magnetic fields produced by the stator during operation. A controller is configured to send a current through a stator winding at a current angle measured from the closest one of the rotor poles. The controller is configured to adjust a current magnitude of the sent current in response to operating conditions. The controller is configured to adjust the current in response to operating conditions.

In some implementations, the stator windings include concentrated windings.

In some implementations, the stator windings include distributed windings.

In some implementations, the stator windings include salient windings.

In some implementations, the rotor windings include concentrated windings.

In some implementations, the rotor windings include salient windings.

In some implementations, the rotor windings comprise non-overlapping windings.

In some implementations, the rotor includes permanent magnets. In some implementations, the permanent magnets are substantially aligned with the rotor poles.

In some implementations, the controller is further configured to energize the stator windings. In some implementations, the controller is further configured to produce a stator magnetic field within the stator by the energized stator windings. In some implementations, the controller is further configured to produce a corresponding rotor magnetic field within ferromagnetic material within a rotor by the stator magnetic field. In some implementations, the controller is further configured to generate a force tangential to the rotor by a magnetic field shift in the stator. In some implementations, the controller is further configured to move the rotor by the generated tangential force. In some implementations, the controller is further configured to maintain a magnetic flux within the rotor by current within rotor coils in response to the magnetic field shift. The stator magnetic field and the rotor maintain synchronicity with one another during operation.

An example implementation of the subject matter described in this disclosure is a method of controlling an electric machine. Stator windings of a stator are energized to produce a stator magnetic field within the stator. A corresponding rotor magnetic field, within ferromagnetic material within a rotor, is modified by the stator magnetic field. A force tangential to the rotor is generated by a shift in the stator magnetic field. The rotor is moved by the generated tangential force. The stator magnetic field and the rotor maintain synchronicity with one another during operation. A decay of a magnetic flux within the rotor is resisted by current within rotor coils in response to the magnetic field shift. A current is sent through the stator windings at a current angle measured from a nearest one of the rotor poles. A current magnitude of the sent current is adjusted in response to operating conditions. The current angle is adjusted in response to operating conditions.

An example implementation of the subject matter described in this disclosure is a wound field rotor synchronous machine with the following features. A stator defines multiple stator poles with associated stator windings. A rotor defines multiple rotor poles. The rotor is configured to rotate synchronously with the stator. The rotor includes rotor windings associated with each of the rotor poles. The rotor windings are configured to be energized by a magnetic field produced by the stator windings. The energized rotor winding producing a rotor field. Permanent magnets are embedded within the rotor. A controller is configured to energize the stator windings. The controller is configured to produce the stator magnetic field within the stator by sending a control signal to the stator windings by sending a current through the stator windings at a current measured relative to a closest one of the rotor poles. The controller is configured to adjust a current magnitude of the sent current in response to operating conditions. The controller is configured to adjust the current angle in response to operating conditions.

In some implementations, the permanent magnets are miss-aligned from the rotor poles.

In some implementations, the stator windings include concentrated windings.

In some implementations, the stator windings include distributed windings.

In some implementations, the stator windings include salient windings.

In some implementations, the rotor windings include concentrated windings.

In some implementations, the rotor windings include salient windings.

In some implementations, the rotor windings include non-overlapping windings.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure relates to a field wound synchronous motor with an electromagnetically directly coupled rotor and stator. The rotor poles of the rotor are both topologically and electrically fixed upon a rotor surface. The rotor is substantially energetically isolated from stator components except for the stator windings. That is, the rotor field is configured to be energized by a magnetic field produced by the stator windings. A stator magnetic field and the rotor maintain synchronicity with one another during operation. During operation, a controller is configured to send a current through the stator and actively adjust the current magnitude and angle in response to present or changing operating conditions. Such a motor is able to operate with the efficiency of a synchronous machine without the need for expensive rare-earth magnets, and without the need of a separate brush or exciter circuitry to energize windings within the rotor.

The electric machines described herein feature shorted, concentrated windings defining the rotor poles. While shorted damper bars have been proposed within rotors for transient dampening, they tend to have a limited frequency response. In contrast, shorted, concentrated windings can provided effective transient damping during operation across a wide range of frequencies. In addition, various electric machines described within this disclosure can take advantage of inherent non-linearity and asymmetry that occurs during saturation of a rotor back-iron. That is, inductance within the coils becomes asymmetric, and produces a net torque as a result.

Thus, the present disclosure provides subject matter for controlling motors electric machines or motors to achieve a variety of different goals. For example, the present disclosures provides systems and methods for achieving desired operational goals without the need for or with reduced reliance upon rare-earth elements or wear elements, such as brushes or exciter circuits, or for improving other operational aspects of the system, such as producing a net torque designed to control undesired torque ripples.

Figure 1:
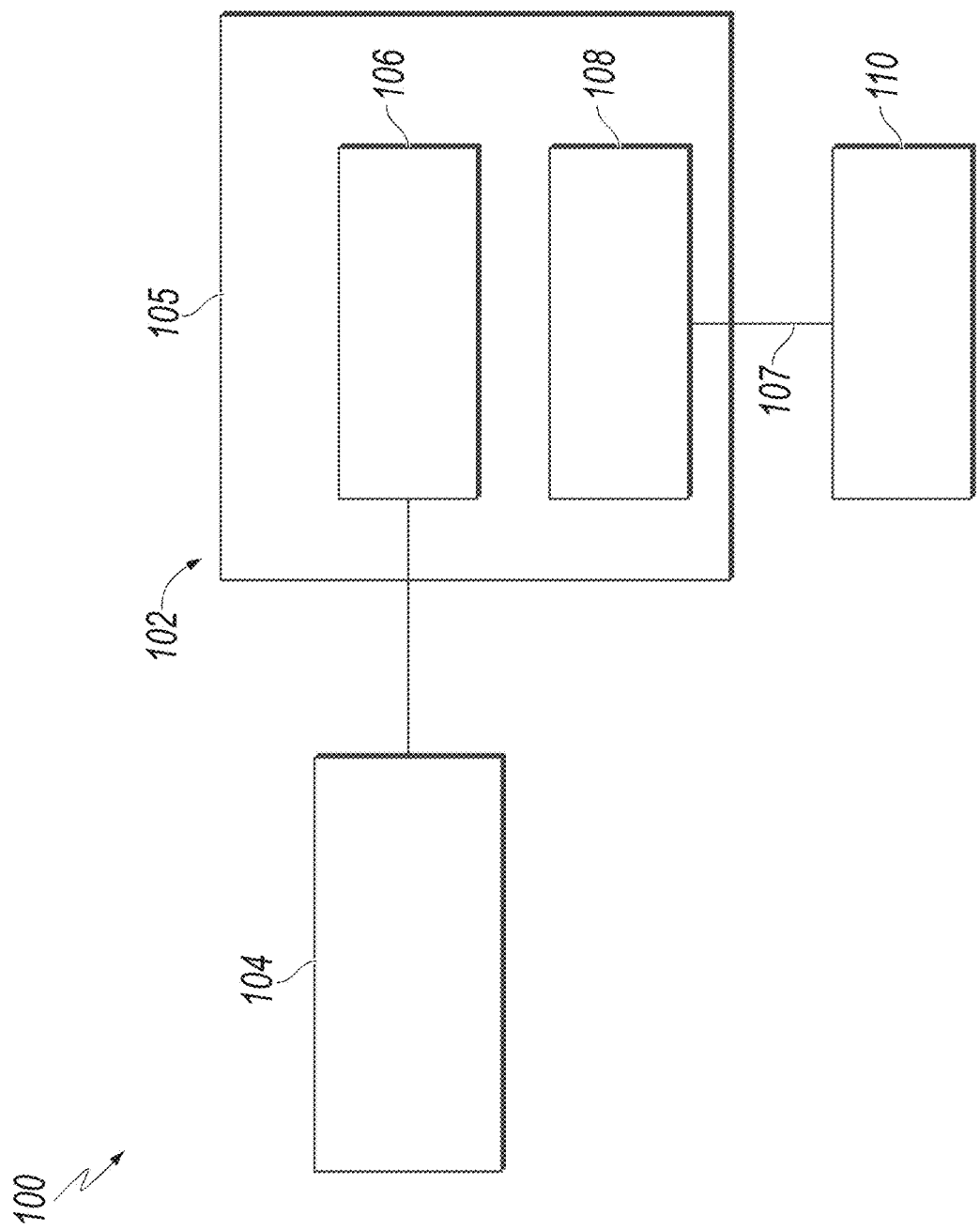
FIG. 1 is a schematic illustration of an example of an electric drive system.

FIG. 1 illustrates an electric drive system 100 that includes an electric motor 102 and a motor controller 104 coupled to the electric motor 102. The motor controller 104 is configured to operate the electric motor 102 to drive a load 110. The load 110 can be an additional gear train such as a gear set, a vehicle wheel, a pump, a compressor, or another motor where multiple motors can be linked and operated in parallel.

The electric motor 102 has an output shaft 107 rotatable with respect to a motor housing 105, which is considered to be a datum with respect to rotations and other motions of motor components. In use, the output shaft 107 can be coupled to the load 110 to which the electric motor 102 can impart rotary power when electrically activated by appropriate electrical power and signals from the motor controller 104. The output shaft 107 may extend through the motor and be exposed at both ends, meaning that rotary power can be transmitted at both ends of the motor. Motor housing 105 can be rotationally symmetric about the rotation axis of output shaft 107, but may be of any external shape and can generally include means for securing the housing to other structures to prevent housing rotation during motor operation.

The electric motor 102 includes an active magnetic component 106 such as a stator and a passive magnetic component 108 such as a rotor. For illustration purposes, in the following, stator is used as a representative example of the active magnetic component, and rotor is used as a representative example of the passive magnetic component.

The rotor 108 is associated with the stator 106 and can be disposed within the stator 106, e.g., in an internal rotor radial-gap motor, or parallel to the stator, e.g., in an axial-gap motor, or in a linear motor. As described more fully below, electrical activity in the stator 106, properly controlled, drives motion of the rotor 108. The rotor 108 is rotationally coupled to the output shaft 107, such that any rotational component of resultant rotor motion is transmitted to the output shaft 107, causing the output shaft 107 to rotate. The stator 106 is fixed to the electric motor 102 such that during operation the rotor 108 moves about the stator 106 or parallel to the stator 106.

Current flowing through a loop of electric wire will result in a substantially uniform magnetomotive force (MMF)

resulting in a motor pole within the wound, or encircled, region. In a typical motor, such a loop has a sufficient diameter to carry the desired current load, but is thin enough that a skin depth of the drive frequency fully penetrates the loop. Many turns, or overlapping loops of wire, may be used to increase the pole magnetic field strength. This topology is typically referred to as a wound field pole. Such a set of overlapping loops is referred to as a coil. For the purposes of this disclosure, multiple coils acting together within the stator or rotor are referred to as a winding. In some instances, coils can overlap and encompass multiple teeth on either a rotor or a stator. Such overlapping coils can be referred to as an armature or a distributed winding. A pole is a magnetic center of this distributed winding, and as such, the pole can move relative to the individual coils within such a distributed winding depending upon the drive current passing through the winding.

The stator 106 defines multiple stator poles with associated electrical windings and the rotor 108 includes multiple rotor poles, such as the examples illustrated with further details throughout this disclosure. The rotor 108 defines, together with the stator 106, a nominal air gap between the stator poles and the rotor poles, such as the example as illustrated with further details throughout this disclosure. The rotor 108 is movable with respect to the stator 106 along a motion direction.

Figure 2:
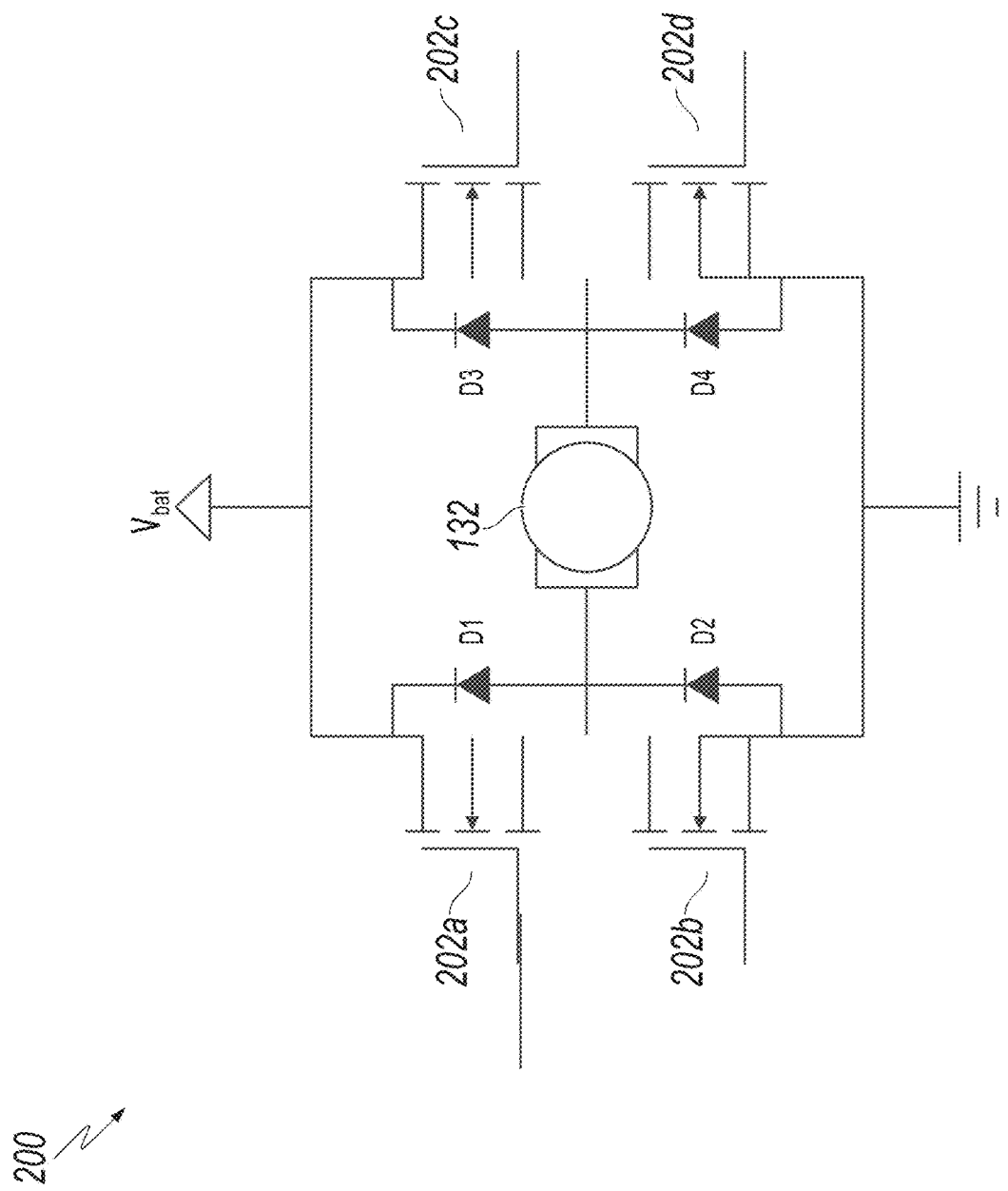
FIG. 2 is a schematic illustration of an example power switch for an electrical winding.

FIG. 2 shows another example power switch 200 for an individual electrical winding 132. The power switch 200 can have an H-bridge circuit including four switching elements 202a, 202b, 202c, 202d, with the electrical winding 132 at the center, in an H-like configuration. The switching elements 202a, 202b, 202c, 202d can be bi-polar or FET transistors. Each switching element 202a, 202b, 202c, 202d can be coupled with a respective diode D1, D2, D3, D4. The diodes are called catch diodes and can be of a Schottky type. The top-end of the bridge is connected to a power supply, e.g., a battery Vbat, and the bottom-end is grounded. Gates of the switching elements 202a, 202b, 202c, 202d can be coupled to the controller 104 which is operable to send a respective control voltage signal to each switching element 202a, 202b, 202c, 202d. The control voltage signal can be a DC voltage signal or an AC (alternating current) voltage signal.

The switching elements 202a, 202b, 202c, 202d can be individually controlled by the motor controller 104 and can be turned on and off independently. In some cases, if the switching elements 202a and 202d are turned on, the left lead of the stator is connected to the power supply, while the right lead is connected to ground. Current starts flowing through the stator, energizing the electrical winding 132 in a forward direction. In some cases, if the switching elements 202b and 202c are turned on, the right lead of the stator is connected to the power supply, while the left lead is connected to ground. Current starts flowing through the stator, energizing the electrical winding 132 in a reverse, backward direction. That is, by controlling the switching elements, the electrical winding 132 can get energized/activated in either of two directions. While primarily illustrated and described as using a single phase H-bridge configuration, a typical six switch inverter system can be used for multiphase machines without departing from this disclosure.

The motor controller 104, can be configured to sequentially operate the switches 134 or 200 for respective pole energization duty cycles to generate magnetic flux across the air gap between the stator poles and rotor poles, as described with further details throughout this disclosure. The switches can be controlled to sequentially energize stator poles to create a local attraction force pulling on the rotor. Such a sequential energization (or activation) can cause a rotation of the rotor 108, the output shaft 107, and the load 110.

Motor components and controls are sometimes discussed in reference to a D-axis 312 (example illustrated in FIGS. 3A and 3B) and Q-axis of a motor rotor and/or stator. The direct axis, or D-axis 312, in a motor may be defined as the center line of a pole perpendicular to the air gap 314, and may be applied to either a stator pole 411 (See FIG. 4) or rotor pole 408. A rotor may be characterized with a D-axis 312 for each pole as viewed in the synchronous reference frame. In a wire wound rotor, the D-axis 312 is the center point of the resultant magnetic center of a coil or field winding regardless of whether the field winding is concentrated to a single, large slot or spread across multiple, smaller slots. Stator poles can be similarly characterized.

The Q-axis is normal (that is, electrically 90°) to the D-axis within the magnetic reference frame. In general, forces along the Q-axis generate an electromotive force, such as torque. Topologically, the Q-axis of a rotor or a stator is typically located directly between two poles.

In such a system where control signals can be transformed into D-Q-axis components, a third z-axis component is also present and can be described as the signal or magnetic quantities that do not map directly onto the D- or Q-axis. For example, a component orthogonal to the plane in which the Q and D components can be found.

The current phasor angle 318 is the relative angle of a rotor pole D-axis to the magnetic center of the stator (example illustrated in FIGS. 3A-3D). A positive current phasor angle indicates that the magnetic center of the stator is ahead of the rotor pole in a direction of motion. Such a situation results in the magnetic center of the stator "pulling" the rotor pole towards the magnetic center of the stator. Similarly a negative current angle indicates that the magnetic center of the stator is behind the rotor pole. Such a situation "pulls" the rotor pole in the opposite direction. Such a negative current phasor angle 318 can be used in braking situations. In some implementations, a current phasor angle 318 of greater than 90° can be used. Such a large phasor current angle 318 can "push" an adjacent pole in the direction of motion. Similarly, a current phasor angle 318 of less than −90° can be used to "push" an adjacent pole in an opposite direction, such as during braking operations. Converting the current phasor angle 318 between the stationary and synchronous reference frames can be done using the following equation:

$$\theta_e = (P/2)\theta_m \qquad (1)$$

where $\theta_e$ is the current phasor angle in the synchronous reference frame, P is the number of stator poles, and $\theta_m$ is a current phasor angle in the stationary reference frame. Regardless of the current phasor angle, it can be broken down into a D-axis component and a Q-axis component. In general, for the motors and generators described herein, the D-axis component acts to "charge" or modulate the field within a rotor pole while the Q-axis component acts to impart a force or torque onto the rotor pole. Throughout this disclosure, adjusting both the current phasor angle 318 and the current amplitude, based on operating conditions, is described in detail.

Current angle, duty cycle, and D-axis to Q-axis current injection, for example, can be all be varied. In some instances, a momentary D-axis current increase may be achieved relative to the Q-axis current by at least 5%, 10%, 20%, or 30% during the D-axis injection period. In some instances, a decrease of resultant current angle may be achieved by, for example, 5-60 degrees, 10-50 degrees, 15-45 degrees, or 22.5-67.5 degrees during the injection cycle. In some instances, an injection pulse width of between 2-70 ms, 5-50 ms, or 10-25 ms may be used. In some instances, a charging duty cycle of 5%, 10% 15%, or 25% of total time of operation may be used. In some instances, the current angle transition period from D-axis injection to normal operation is 500 us to 15 ms, 2 ms-12 ms, or 4 ms-10 ms, as determined by rotor current decrease to zero. In some instances, the current angle is changed by less than 15 degrees, 10 degrees, or 5 degrees. In some instances, the D-axis and Q-axis magnitude vary concurrently by at least 5%, 10%, 20%, or 30% during the D-axis injection period. The system may be operated as current controlled or voltage controlled. For example, irrespective of the particular operational parameters, the signal may be injected via a current source inverter with a current injection ripple magnitude variance that is controlled to be within a desired tolerance.

As described throughout this disclosure, the coil structures on the rotor receive the power/signals from the stator through an inductive coupling, including at least one loop about a rotor pole. In some implementations, the rotor coil for conductive loop form a capacitance, where, in some implementations, the capacitance is formed, inserted, or defined by a certain part of the rotor coil or conductive loop. In some implementations, the rotor coil or conductive loop includes a resonant frequency. In some implementations, the resonant frequency of the rotor coil is in the transmissible range of the magnetically permeable pole or rotor coil material.

In operation, a rotor pole can be fluxed via a D-axis signal on the stator while the coil structure resists the change in flux on the pole and flows current. A Q-axis signal on the rotor produces torque on the fluxed machine. In some topologies, for example in a salient pole wound synchronous machine, maximum torque per ampere (MTPA) occurs at a current angle of between 60-90 degrees. For a given operating condition (e.g., torque and speed) the controller establishes the MTPA (e.g., through a lookup table or model-based estimator) which includes a combination of D-axis and Q-axis currents (principal control components) that establish a current phasor angle. This current phasor angle may be modulated or oscillated about to periodically maintain the desired level of rotor flux, which may be monitored by an observer or estimator, or established through a model-based approach. As the D-axis is modulated to increase the rotor flux, the magnitude of the Q-axis current may be proportionally modulated to limit torque ripple and reduce any adverse effects of changing the current phasor angle, or to limit the change in the current phasor angle.

Figure 3A:
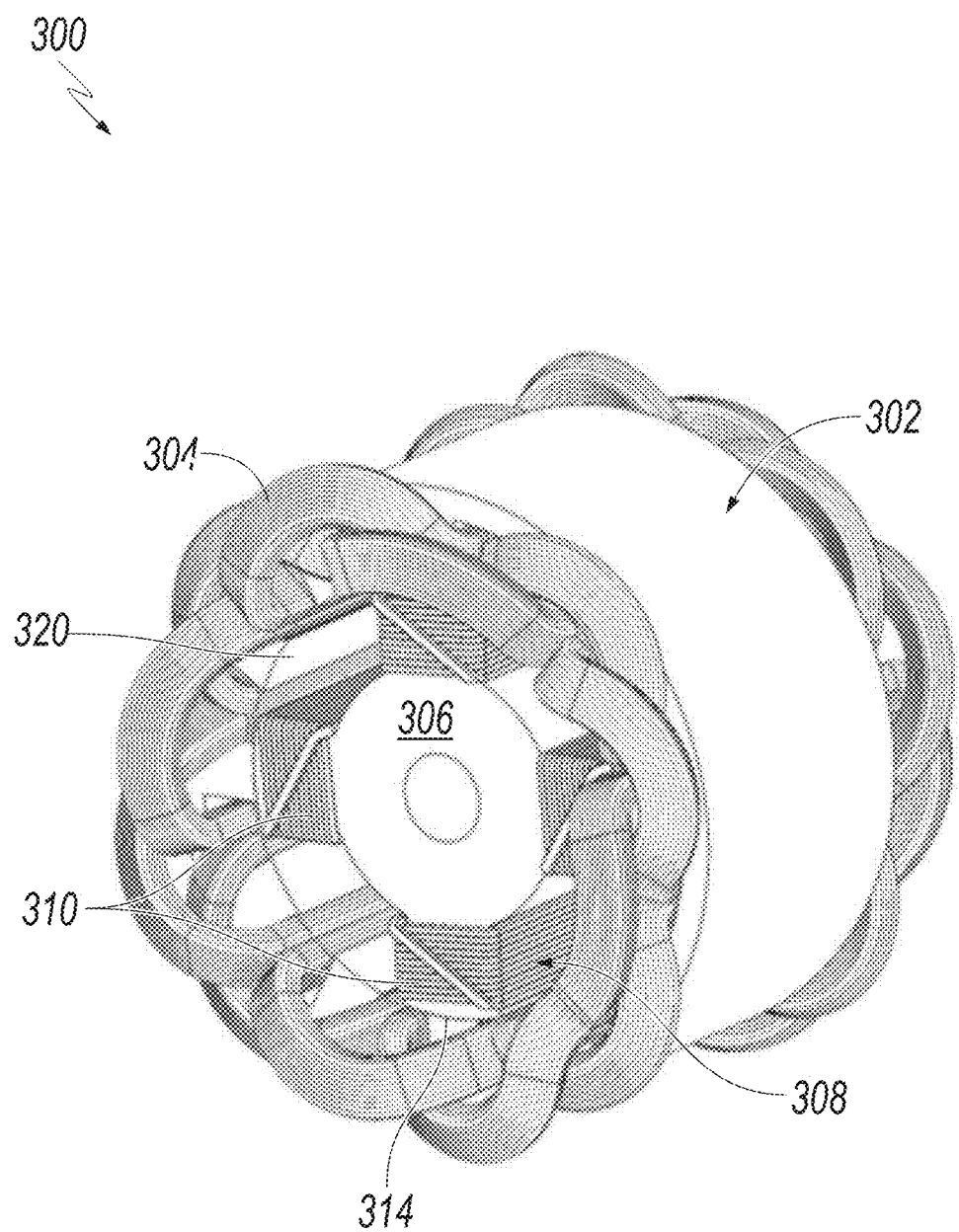
FIG. 3A-3B are a perspective view and a side view of an example electric machine.
Figure 3B:
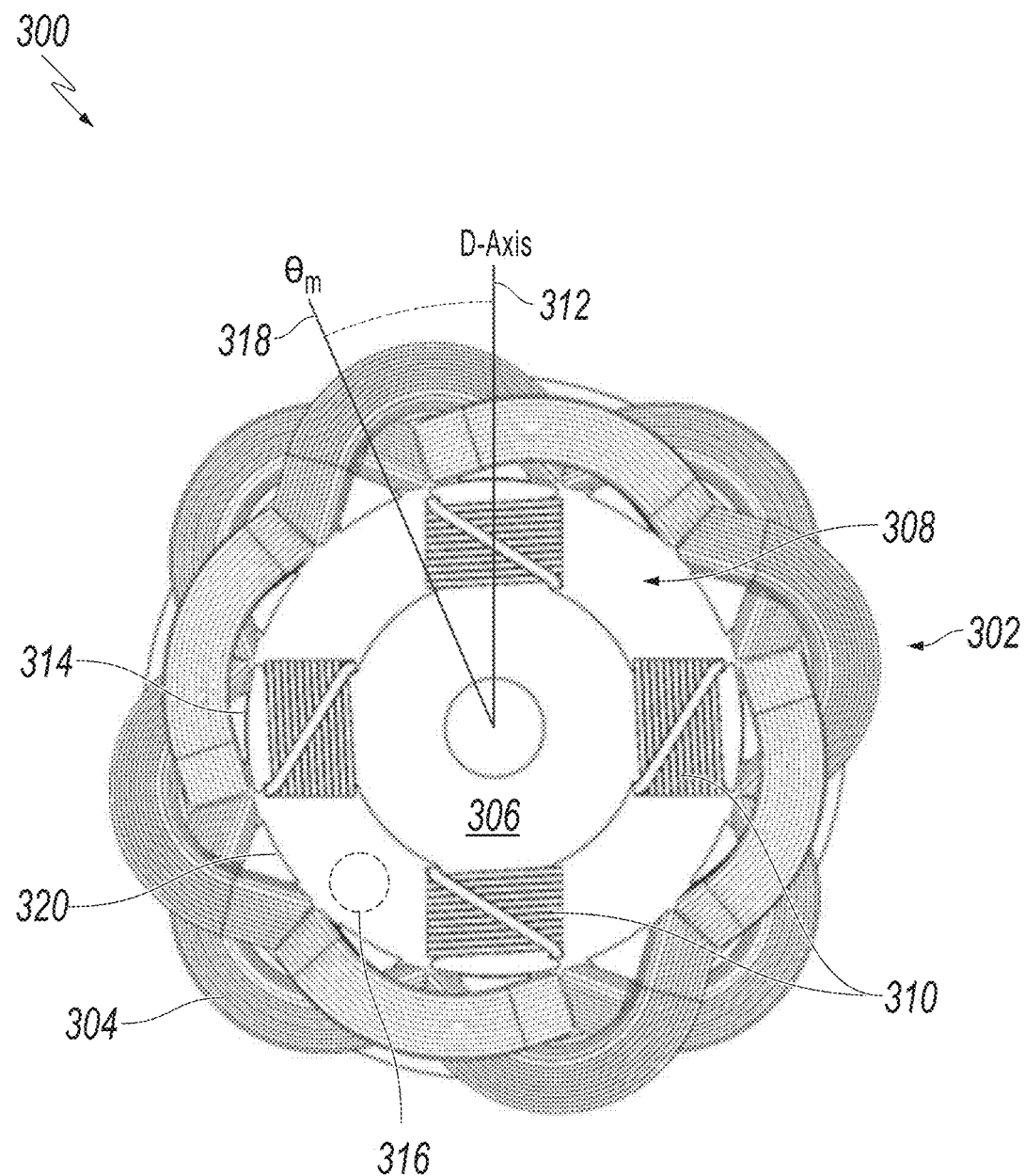

FIGS. 3A-3B are perspective and side views of an example electric machine 300. The electric machine 300 includes a stator 302 defining multiple stator poles with associated stator windings 304. A "motor pole" may be described as topological section on either a stator or rotor that emits a single polarity of magnetic flux across the air-gap at a given point in time. Flux carried in the back-iron of the stator or rotor is considered when determining the pole number or location in an electric motor. Poles are typically characterized by high field regions, which may exceed 5,000 gauss. Poles may result from permanent magnets or from electromagnetic fields. While the number of poles on a stator or rotor are often fixed during manufacturing, in some implementations described herein, the number of poles for the rotor, stator, or both, can be changed during operation.

While the presently illustrated stator 302 is presently illustrated as having distributed stator windings 304, a salient, concentrated, and/or non-overlapping stator can similarly be used without departing from this disclosure.

A rotor 306 defines multiple rotor poles 308 with associated rotor coils 310. The rotor poles 308 are topologically and electrically fixed upon a rotor surface. A fixed-pole rotor is a rotor in which the poles are topographically and electromagnetically fixed or held static relative to synchronous reference frame, for example, rotor 306 is a fixed-pole rotor. That is, the rotor 306 will always rotate at substantially the same speed as, or in sync with, the drive frequency provided by the stator (allowing for inherent levels of torque ripple). The synchronous reference frame is the same as the magnetic reference frame. Fixed-pole motors are often referred to as "synchronous" motors for this reason. Field wound rotors, surface PM rotors, reluctance motors, and interior PM rotors are all examples of fixed pole rotors. Fixed pole rotor designs maximize the utilization of ferromagnetic material in the rotor D-axis 312 region (center of a rotor pole), and in the case of wound field rotors, ensuring that the effective magnetic center aligns with the D-axis 312. As a result, fixed pole rotors are considered to be more efficient than shifting pole rotors for a given size and power rating; however, fixed pole rotors are difficult to control in that maintaining a fixed pole rotor at a constant current phasor angle under dynamic load conditions and dynamic running speeds is challenging. For example, accelerating the motor or maintaining speed during a change in load involves actively adjusting the current phasor angle 318, the current magnitude, and/or drive frequency based on input from a position sensor 316. The concepts described herein are primarily applicable to synchronous machines as the stator magnetic field and the rotor, for example, the rotor 306, maintain synchronicity with one another during operation.

In contrast, the poles of shifting pole rotors are not topographically or electromagnetically fixed and will move under operation relative to the stationary reference frame. That is, the rotor will always "slip" and lag behind, or be out of synch with, the drive frequency provided by the stator. As such, these motors are often referred to as "asynchronous" motors. Examples of shifting pole rotors include wire wound and squirrel cage induction rotors, armature wire wound rotors, brush motors, and other similar motors. While shifting pole rotors are able to self-regulate current phasor angle 318 during operation, design concessions between D-axis ferromagnetic material and Q-axis field windings must be made to enable the pole to move evenly across the rotor surface. As a result, electrical resistance in such motors is higher, more starting current is required, and field strength is lower in shifting pole rotors of a given size and power rating.

The field of the rotor 306 is configured to be energized by a magnetic field produced by the stator windings 304. The rotor 306 and the stator 302 are configured to move relative to one another responsive to the energized rotor field. The rotor 306 is substantially energetically isolated from components of the stator 302 except for the stator windings 304.

Within electric machines, a stator and a rotor can be coupled to enable power transfer, signal transfer, and/or field modulation during operation. Couplings may be classified as direct coupling or indirect coupling. Direct coupling occurs between the stator 302 and the rotor 306 along the primary operating air-gap, such as the air gap 314. Indirect coupling occurs along a secondary interface away from the primary operating air-gap.

Direct couplings are typically characterized as inductively coupled, for example, a squirrel cage induction rotor is considered to be directly coupled to the stator. While direct coupling is common and easily controlled in an asynchronous machine, direct coupling with synchronous machines, for reasons described throughout this disclosure, are difficult to control. For example, a rotor position often needs to be known to ensure that a current magnitude and/or frequency is properly maintained.

Indirect couplings operate along a secondary coupling and may be radially oriented or axially oriented, and may communicate via electrical contacts, inductive couplings along a separate air-gap, capacitively coupled, or optically coupled. While secondary coupling may be used for a variety of functions to improve the efficiency and/or overall controllability of an electric machine, additional components are often required that can increase the weight, complexity, failure frequency, and costs (both operating and capital costs) of machines that take advantage of such systems.

Couplings may further be classified as either power couplings or signal couplings. Power couplings transmit power from the stator to the rotor to be used to directly drive magnetomotive force along the primary operating air-gap, thereby generating torque. Signal couplings transmit signals between the stator and rotor that may be used to separately adjust an electric circuit within the rotor or monitor a rotor condition, such as temperature or position relative to the stationary reference frame. Signal couplings transmit very low power level relative to the power rating of a motor, for example, less than 5% of the power rating of the motor. In some implementations or under some operating parameters, it may be desirable for the signal couplings to transmit power at a level relative to the power rating of the motor of, for example, 7.5%, 5%, 3%, or 2.5%.

Energetically isolated motors and generators, such as those described throughout this disclosure, primarily (within standard electromagnetic shielding tolerances) use direct coupling to transmit power and signals between the stator and the rotor without the use of an indirect or secondary coupling. The electric machines described herein include direct coupling between the rotor 306 and the stator 302 for both power coupling and signal coupling.

In some implementations, a wound rotor may need to be, or benefit from being, charged when located on position D, as illustrated in FIG. 3B, or transitioning from the position D to position Q through modulation of the current phasor angle. Charging may mean generating current in the rotor winding, or windings, or transferring, increasing, or storing magnetic flux in the rotor, each of which may involve some power transfer from the stator to the rotor. Such a task can be accomplished in a variety of ways, for example, by advancing modulating a current phasor angle of stator excitation (e.g., advancing or retarding the current angle of stator excitation as appropriate), increasing a frequency of change in the stator excitation current phasor angle, increasing magnitude of excitation current in the stator (or any of its resultant signal components), or any combination thereof. In some instances, the rotor field may need to be weakened (e.g., decreasing the level of current or magnetic flux present in the rotor and/or rotor field winding), for example, when by operating on or near position D' (e.g., by transitioning from position Q to position D', or from position D' to Q'). Such a task can be accomplished in a variety of ways, such as modulating the current phasor angle (e.g., advancing or retarding the current angle of stator excitation as appropriate), decreasing the frequency of stator excitation current angle phasor change, decreasing the magnitude of excitation current in the stator (or any of its resultant signal components), or any combination thereof. Alternatively or in addition, field weakening can be accomplished through a passive loss of rotor field winding current via ohmic losses. In operation, a frequency and harmonic independence can be observed in some implementations between the signal emitted by the stator, and the base operating frequency that determines rotor speed. As will be described, the present disclosure recognizes that control of the motor can be achieved in a way that prioritizes additional goals beyond just moving the rotor, such as increasing the efficiency of the system, controlling the losses in the system, or mitigating the potential for operational circumstances that could damage or reduce the effectiveness of the system. Further details on such a system are described throughout this disclosure, for example, FIG. 6 and the associated description.

Figure 3C:
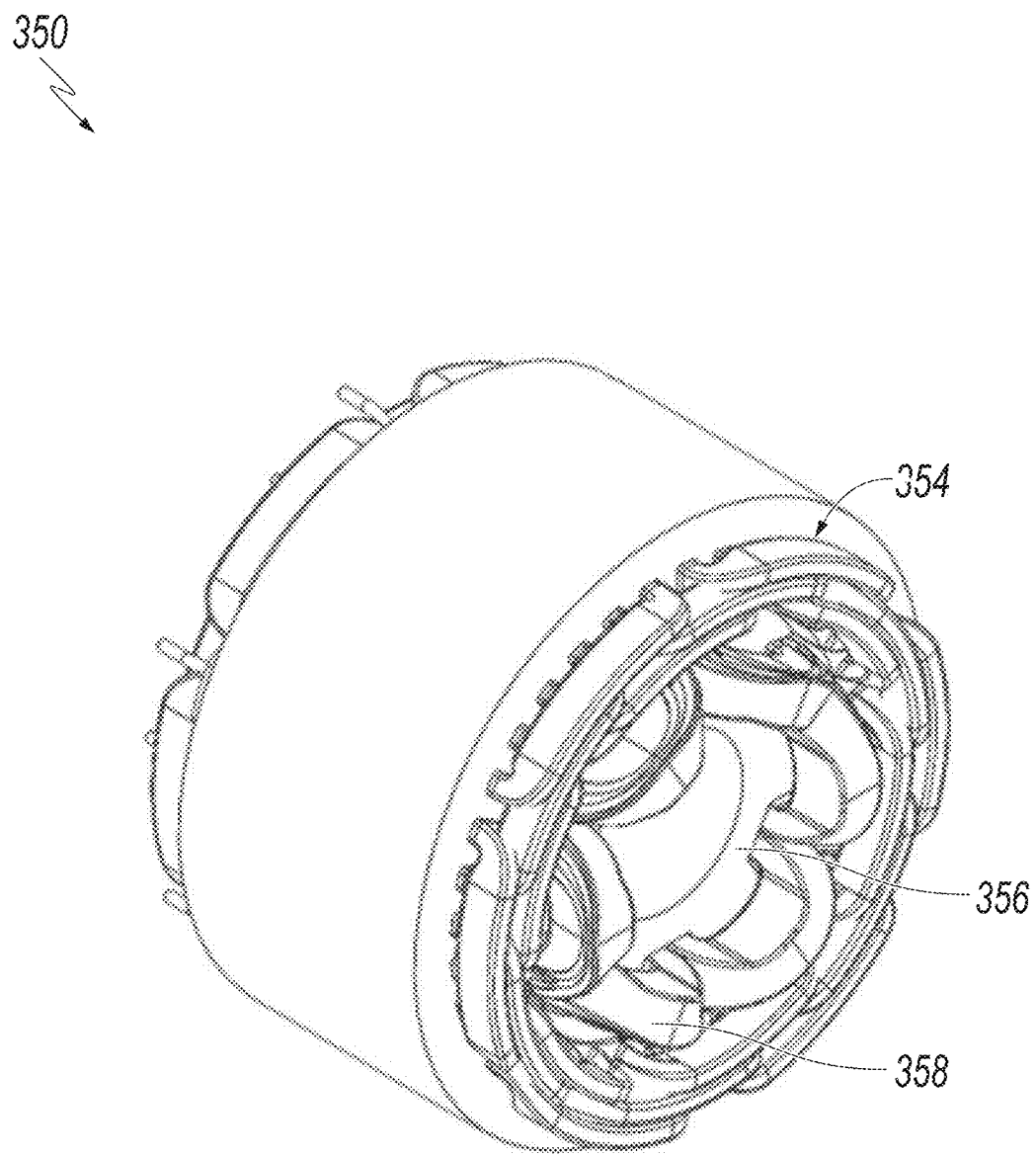
FIGS. 3C-3D are perspective and a side view of an example electric machine.
Figure 3D:
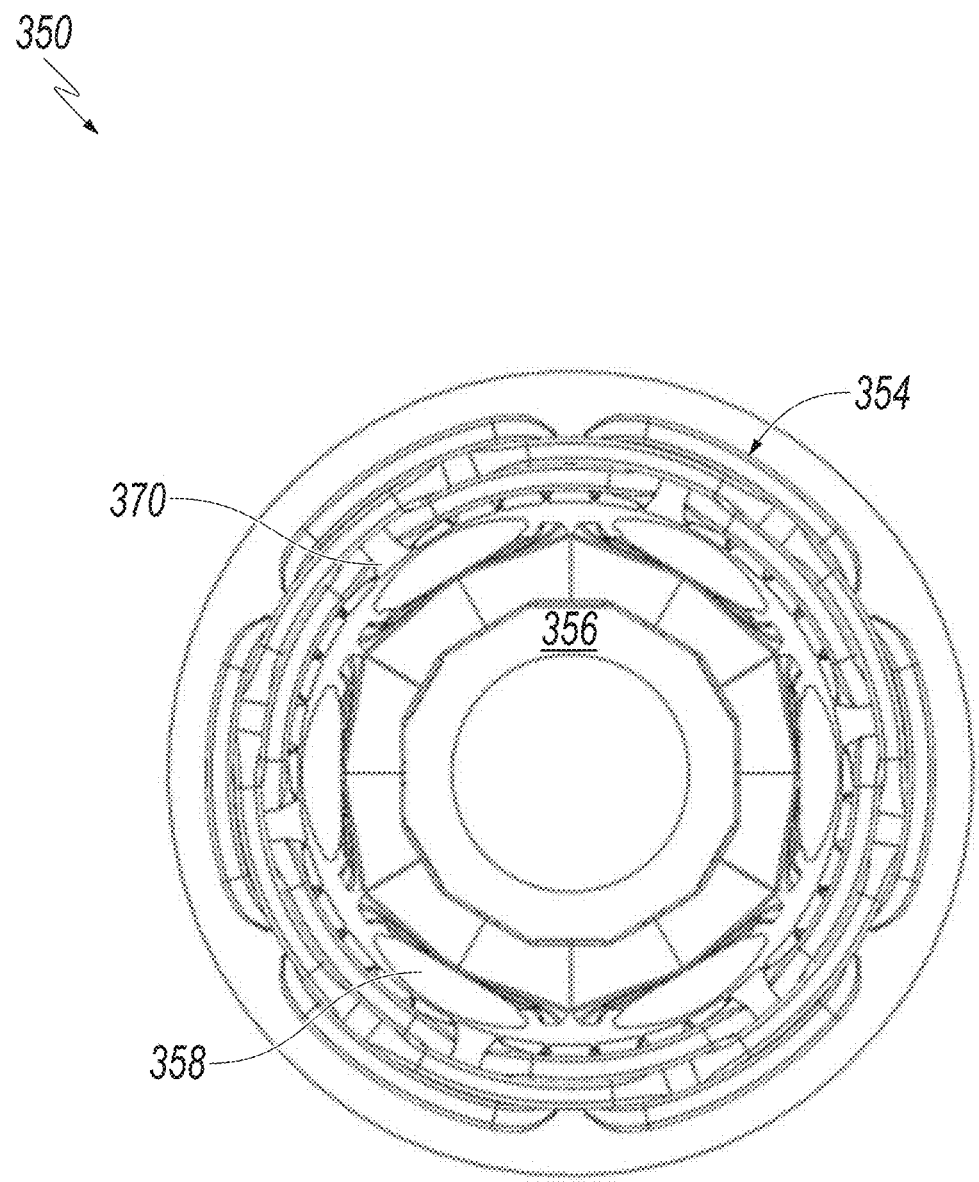

FIGS. 3C-3D are perspective and side views of an example electric machine 350. The electric machine 350 is substantially similar to the electric machine 300 with the exception of any differences described herein. The rotor 356 includes six rotor poles 358. The stator 352 includes a distributed winding 354. The electric machine 350 has six rotor teeth (poles 358) and thirty-six stator teeth 370, resulting in a rotor tooth to stator tooth ratio of 1:6. This is different from the electric motor 300, which includes four rotor teeth (poles 308) and twelve stator teeth 320, resulting in a rotor tooth to stator tooth ratio of 1:3. Other rotor teeth to stator teeth ratios can be used without departing from this disclosure, for example, ratios of 1:2 or 1:4 can also be used. Other ratios of rotor teeth to stator teeth can be used without departing from this disclosure regardless of whether salient, concentrated stator winding are used or if distributed stator windings are used.

Figure 4:
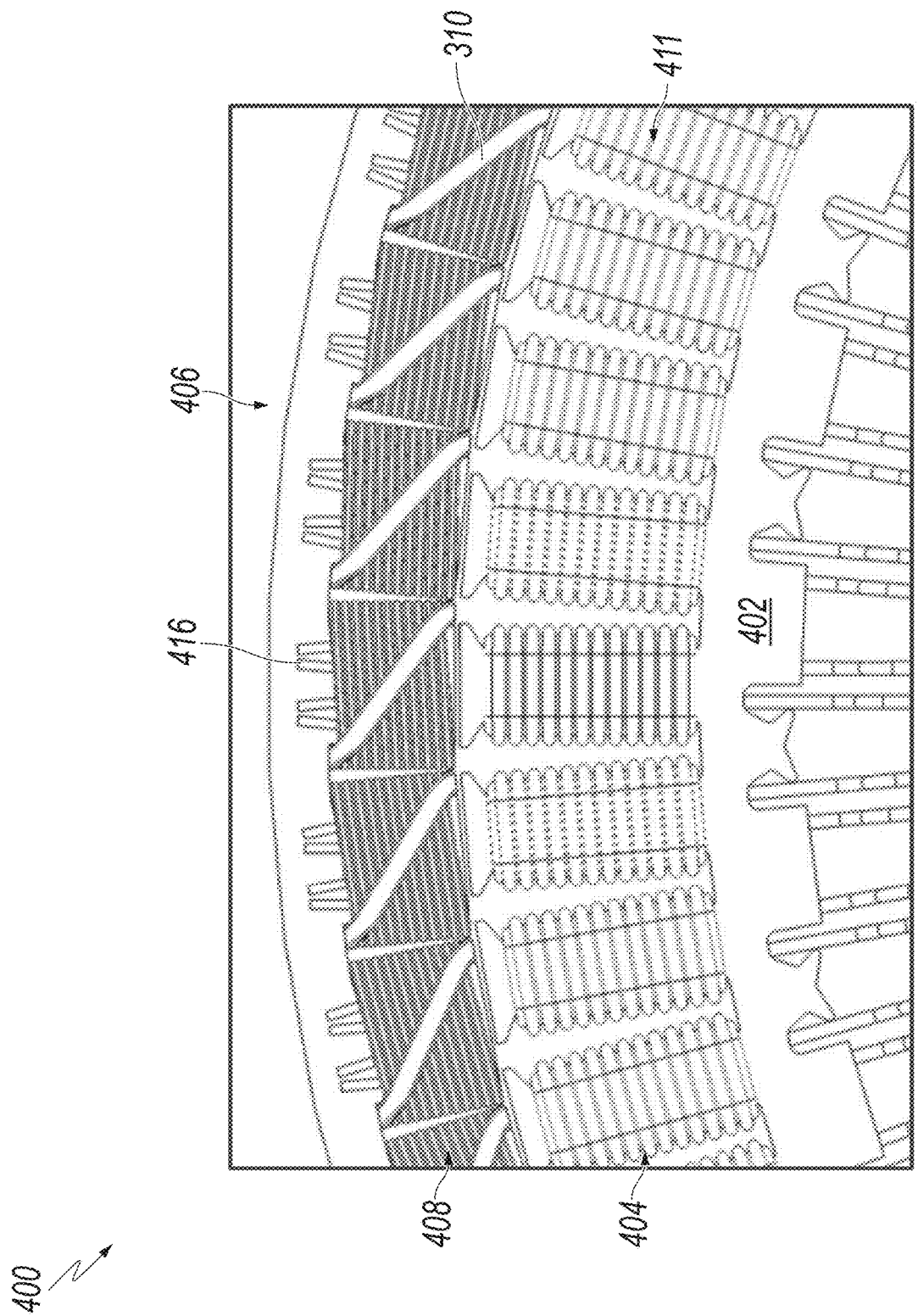
FIG. 4 is a side view of an example electric machine.

FIG. 4 is a side views of an example electric machine 400. The electric machine 400 is substantially similar to the electric machine 300 previously described with the exception of any differences described herein. The rotor 406 is an external rotor while the stator 402 is an internal stator. In other words, the rotor 406 surrounds the stator 402 and rotates around the stationary stator 402. The stator 402 defines stator poles 411 with concentrated, salient, non-overlapping stator windings 404. The rotor 406 includes permanently magnetic material 416 embedded within the rotor 406. As illustrated, each rotor pole 408 includes four channels of permanently magnetic material 416 arranged in a substantial "M" of "W" configurations; however, other arrangements can be used without departing from this disclosure. The permanently magnetic material 416 can be include a variety of material, including ferrite, SmFeN, N35, N45. While lower power permanent magnetic material is typically used, higher powered magnetic material in lower quantities can be used without departing from this disclosure. The permanently magnetic material 416 can extend across the entire longitudinal length of each rotor pole 408 or partially across each rotor pole 408. In some implementations, the permanently magnetic material 416 can be made-up of multiple layers or laminations.

As illustrated, the permanently magnetic material 416 results in a net magnetic force that is substantially aligned with each rotor pole 408. In some implementations the permanent magnetic material can be arranged such that the net magnetic force from the permanent magnetic material 416 is miss-aligned from the rotor poles 408. In general, the arrangement of the permanent magnetic material is dependent upon the desired cross-sectional flux density of the magnetic materials within the rotor. In implementations where the permanent magnetic material 416 is located within a rotor coil 310, the flux for each set of permanent magnetic material 416 can be individually adjusted and/or modulated by adjusting the charge of the surrounding rotor coil 310. Such implementations also protect the magnets from demagnetization that can be caused by a strong stator field. In implementations where the permanent magnetic material 416 is not surrounded by a rotor coil, an adjustment in flux caused by the stator field can affect multiple sets of permanent magnetic material 416 within the rotor 406.

Figure 5A:
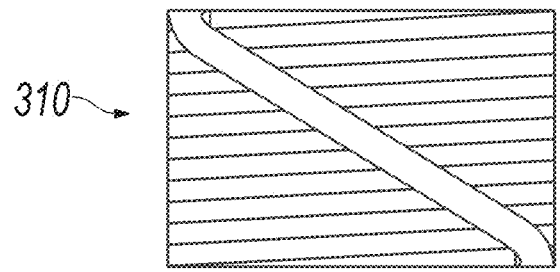
FIG. 5A is a front views of example rotor coil.
Figure 5B:
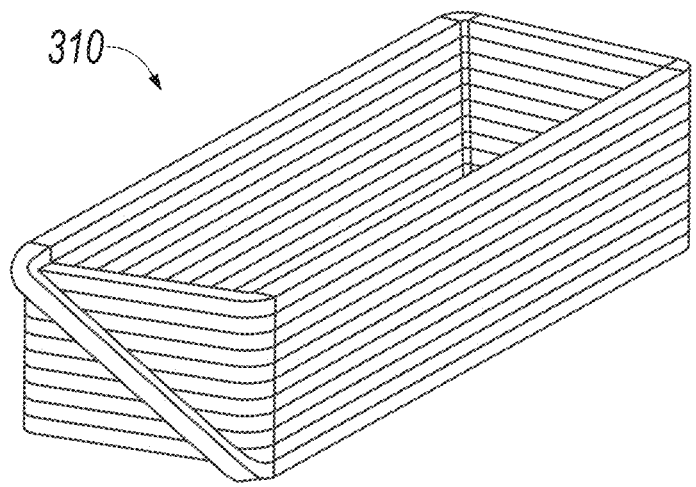
FIG. 5B is a perspective view of the rotor coil of FIG. 5A.
Figure 5C:
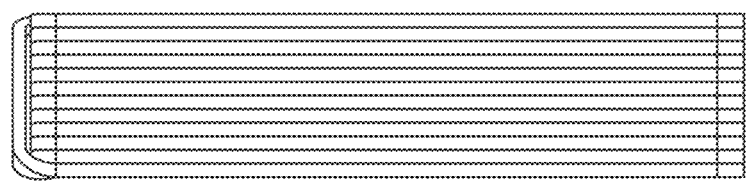
FIG. 5C is a side view of the rotor coil of FIGS. 5A and 5B.

FIGS. 5A-5C are front, side, and perspective views of example rotor coil 310. As illustrated in FIGS. 3A, 3B, and 4, each rotor coil 310 acts as its own winding with a single coil around each pole, such as rotor poles 308 or 408. As such, the rotor can be described as including concentrated, salient, and/or non-overlapping windings. In some implementations, the winding direction of each coil can alternate with each adjacent rotor pole 308 or 408. For example, in implementations using a stator with salient, concentrated, and/or non-overlapping windings, such an arrangement can be used. In some implementations, the winding direction does not need to alternate between adjacent rotor poles. For example, in implementations using a stator with distributed windings, such an arrangement can be used. While the coil 310 are illustrated as a single coil of wire shorted upon itself, other geometries can be used so long as each coil shorts upon itself and does not overlap with an adjacent coil. In general, rotor coils are often configured such that the electrical current skin depth of the power transfer frequency fully penetrates the conductor of the coil. "Electrical current skin depth" in the context of this disclosure refers to the depth from the surface of a conductor at which electric current mainly flows, particularly eddy current induced from a magnetic field changing at a given frequency. For a given material, skin depth can be calculated as:

$$\delta = 1/\sqrt{\pi f \mu 0} \quad (2)$$

where 'f' is the magnetic switching frequency, u is the magnetic permeability (in H/mm) of the material, and σ is the electrical conductivity of the material. Achieving full skin depth penetration within the rotor coil 310 allows for a uniform inductance within the rotor coils 310. In some implementations, drive frequencies can extend between 0 hertz and 20 hertz. In some implementations, drive frequencies can range between 100 hertz and 2000 hertz. In general, the rotor coils are arranged such that a decay of a magnetic flux within the rotor is resisted by current within rotor coils in response to a magnetic field shift from the stator.

Traditionally, synchronous motors do not have magnetizing current to magnetize a material so magnets have to be magnetized at the factory or prior to installation. To that effect, if the magnetic material demagnetizes under operation (e.g., because the stator is putting too much of a load on it) the magnet can be damaged, or the motor can be rendered inoperable entirely. The rotor coils 310 help protect the permanent magnets from the potential demagnetization effects of the stator. High levels of charge occur when operating between the Q-Axis (90°) and the D-axis (0°), with substantial inductive decay (e.g., maintaining a field). The decay can be observed by the current passing through the rotor coil (310, 410) to resist the change in flux. Under such a control scheme (combined with the coils 310 or 410), the rotor field can be modulated based upon the current phasor angle. This can translate into a wide operating envelope during operations. The D-axis to Q-axis operation can, in some instances, allow the shielding effect that would protect magnetic material, which allows less magnetic material, lower coercivity material, or both. Alternatively or in addition, the field weakening with D-axis injection is not constant, as compared to that of a permanent magnet machine. Similarly, the rotor field can be modulated by the current magnitude passing through the stator. In many cases, both the current magnitude and the current phasor angle can be adjusted simultaneously for desired rotor field modulation.

Figure 6:
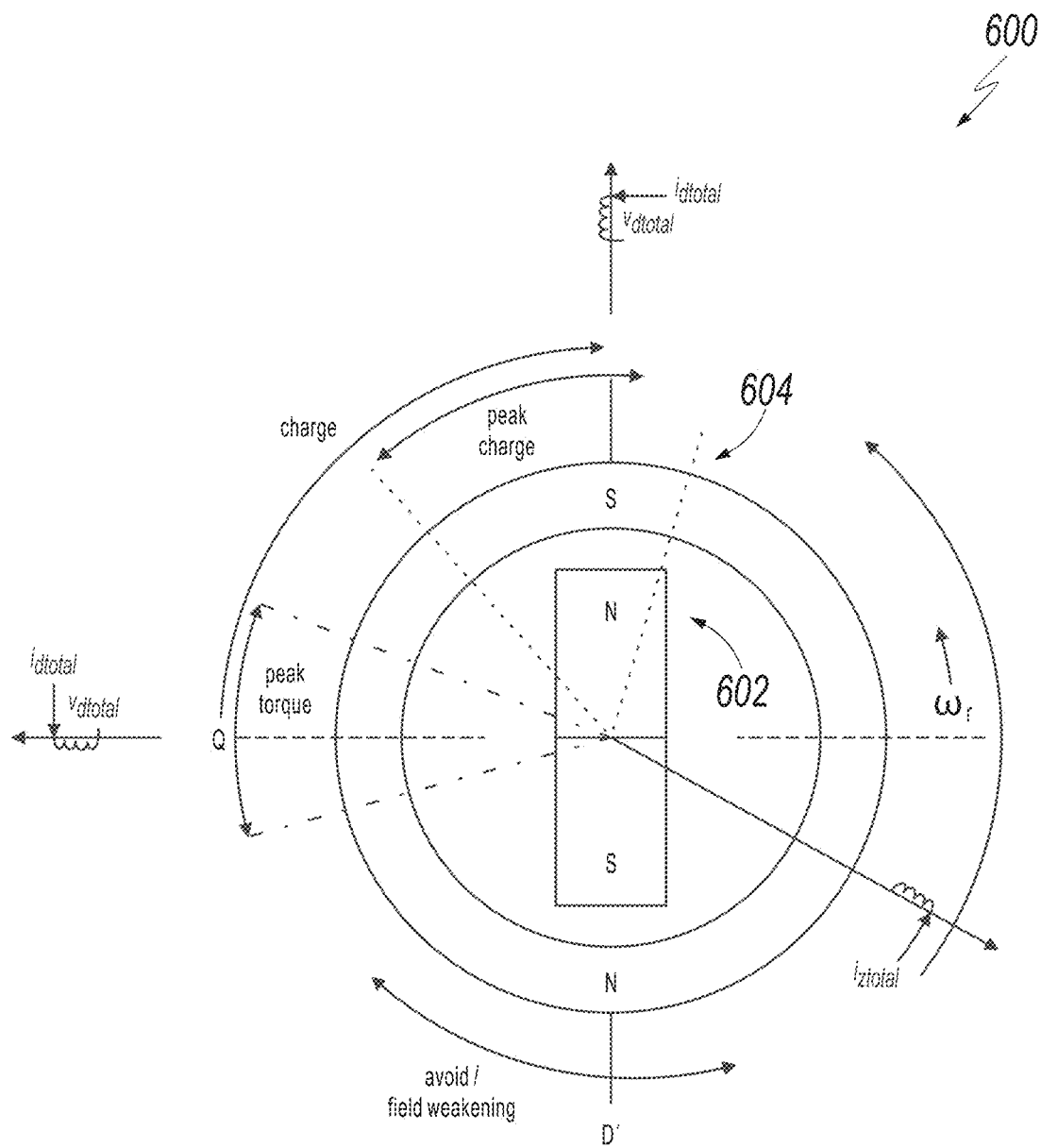
FIG. 6 is a schematic diagram of an electric motor configured for control in accordance with the present disclosure.

FIG. 6 is a schematic diagram of an electric motor 600 with alignments between the rotor 602 and the stator 604. Position D is defined as opposite stator 604 and rotor 602 poles being aligned (i.e., N-S and S-N). Position Q and Q' is defined as fully unaligned poles (i.e., approaching similar poles and opposite poles respectively) or electrically orthogonal to D, and D' as similar stator 604 and rotor 602 poles are aligned (i.e., N-N and S-S). In some implementations, especially in rotors with high saliency, peak toque occurs between the D and Q positions in the synchronous reference frame (e.g., due to its reluctance component). In other implementations (e.g., machines with less salience) such as round rotors, peak torque occurs between Q and D' positions. In instances where a permanent magnet motor is used, peak torque operation can cause demagnetization at high load and require field weakening at high speed. Weaker magnets can be used to the detriment of size/weight and/or torque production.

In some embodiments, permanent magnets may be used. To increase the magnetic current capabilities without risk of demagnetization, the rotor windings described herein are used. At lower torques, rotor winding current can be allowed to reduce lowering cogging (resistive) torque and eliminating the need for active flux weakening of stronger permanent magnets. Using the modulation of the current phasor angle herein, the wound rotor can be flux weakened or strengthened (e.g., current decrease or increase within the rotor field winding and flux within the rotor pole itself) through control mechanisms. As one non-limiting example, the current phasor angle of the synchronous excitation from the stator may be modulated. In at least some configurations, there is no need for a secondary control system or additional commutation hardware such as in a wound rotor synchronous motor, for example, such as to control the stator field).

As described herein, wound rotor configurations in accordance with the present disclosure do not require additional stator-to-rotor coupling elements. Rather, signals are transmitted using the stator windings and rotor windings along with the rotor laminations. This reduces costs and componentry, increases performance (e.g., eliminating ohmic losses of brushes), eliminates or controls physical contacts and wear components, reduces package size, and provides control flexibility compared to schemes that incorporate special detectors, sensors, wired or wireless connections, or brushes to transmit signals from stator to rotor.

As described throughout this disclosure, in a system where control signals can be transformed into D-Q-axis components, such as illustrated in FIG. 6, a third z-axis component is also present and can be described as the signal or magnetic quantities that do not map directly onto the D- or Q-axis. For example, a component orthogonal to the plane in which the Q and D components can be defined, as illustrated.

In operation, field oriented or vector controls with specific modulations (e.g., signal, or signal parameter modulations) may be used to control various aspects of the rotor field.

Figure 7:
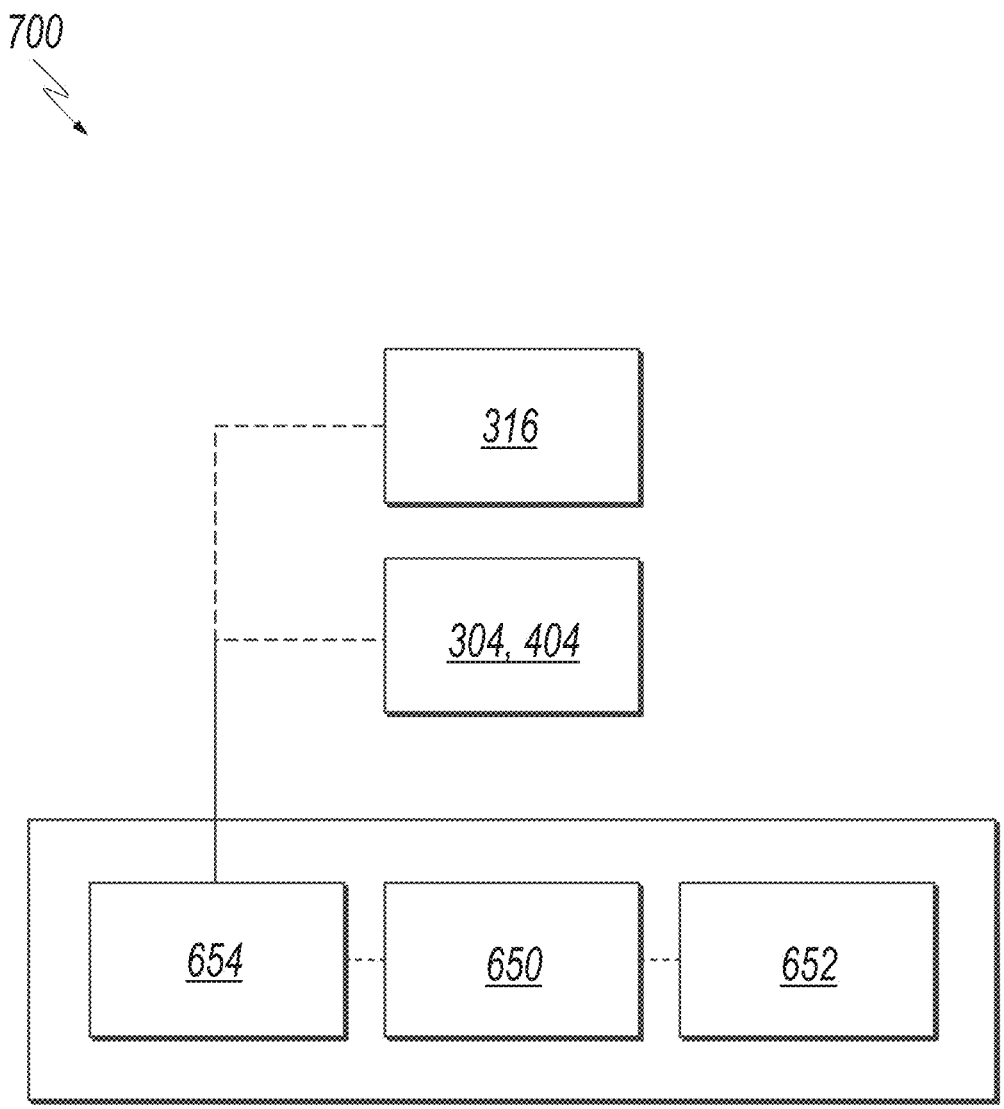
FIG. 7 is a block diagram of an example controller that can be used with aspects of this disclosure.

These modulations can be used to adjust signal excitations that couple between the stator and rotor, as well as control the stator excitation wave (e.g., relative position and magnitude) with respect to the rotor. Thus, a direct correlation of rotor response, or current induced in a rotor winding, can effectively be "steered" by the stator and inverter. In other words, such control can create dynamic behavior of a machine that is a function of currents in a D-axis and Q-axis fields, as coordinated by a controller, such as controller 104 or controller 700 (FIG. 7). Amongst other strategies (e.g., torque production), vector modulation can be used to help define the modulation of the current phasor angle.

The present disclosure recognizes that vector control modulation may be used to directly affect rotor reactions through stator signals that are imposed. Furthermore, these rotor reactions may be modulated on either the D-axis or Q-axis and may be realized using current phasor angle modulation. The relative effectiveness of current phasor angle modulation may be proportionate to both the magnitude and the percent change of the modulation (e.g., over a time period). The speed of adjusting a current phasor angle can vary on the controller and may be selected on the intended response in the rotor material or rotor response. In some cases, a frequency can be chosen based upon the speed of the machine and, in other cases, a fixed modulation can be chosen. The frequency of the modulation may be selected based on a variety of considerations. For example, in some configurations, the frequency may be at least 2-4 times higher than the fundamental frequency of the machine. In other situations, the modulation may be 5-10 times higher than the fundamental frequency of the machine. In still further, configurations, the frequency may be 10-30 times higher than the fundamental frequency of the machine. For example, the frequency, in some configurations may be selected to prevent an interaction with torque generation (e.g. to reduce torque ripple). Current phasor angle can be controlled using a vector component control, which may be described by letting $i_d$, $i_q$, and $i_z$ be the currents at fundamental frequency represented in the D-Q reference frame illustrated in FIG. 6 (e.g., principal control components that comprise the current phasor angle). These signals may be modulated directly, or alternatively, it is possible to add an independent excitation modulation in any of the D/Q axes that is added onto the fundamental currents resulting in a total stator current:

$$i_{d_{total}} = i_d + i_{d_{modulation}} \quad (3)$$

$$i_{q_{total}} = i_q + i_{q_{moduation}} \quad (4)$$

$$i_{z_{total}} = i_z + i_{z_{modulation}} \quad (5)$$

where $i_d$, $i_q$, and $i_z$ are the normal excitation currents along each axis, $i_{d_{excitation}}$, $i_{q_{excitation}}$, and $i_{z_{excitation}}$ are the independent modulation signals that can be selected and controlled by the motor controller or other controller, as will be further described and. Modulations can be chosen to be sinusoidal or take any form, for example, such modulation can be further described as:

$$i_{d_{excitation}} = m_d \cos(w_d t) \quad (6)$$

$$i_{q_{excitation}} = m_q \sin(w_q t) \quad (7)$$

$$i_{z_{excitation}} = m_z \sin(w_z t) \quad (8)$$

The modulation magnitude and frequency can be chosen independently per component and vector sum to alter the current phasor angle, or by controlling the current phasor angle ($\gamma$) directly to alter the principal components:

$$i_{d_{total}} = i_d * \cos(\gamma) \quad (9)$$

$$i_{q_{total}} = i_q * \sin(\gamma) \quad (10)$$

$$i_{z_{total}} = i_z * \sin(\gamma) \quad (11)$$

Similarly, modulations may be made about a set current phasor angle such as:

$$i_{d_{total}} = i_d * \cos(\gamma + \gamma_{modulation}) \quad (12)$$

$$i_{q_{total}} = i_q * \sin(\gamma + \gamma_{modulation}) \quad (13)$$

$$i_{z_{total}} = i_z * \sin(\gamma + \gamma_{modulation}) \quad (12)$$

where $\gamma_{modulation}$ may be, for instance, described as a sinusoidal oscillation about a fixed current angle:

$$y_{d_{modulation}} = m_d \cos(w_d t) \quad (13)$$

$$y_{q_{modulation}} = m_q \sin(w_q t) \quad (14)$$

$$y_{z_{modulation}} = m_z \sin(w_z t) \quad (15)$$

In each case, modulations may be applied to a single axis, whereby no modulation is applied to the other two axes and are used to generate a rotor response. Alternatively or in addition, a D-axis current modulation can be used, or varied alongside a Q-axis current modulation, with the goal of controlling or minimizing torque ripple. A Q-axis modulation can be used if the D-axis modulation is insufficient. In some implementations, a Q-axis modulation is used in combination with D-axis modulation to form a rotating vector injection. Z-axis modulation does not inherently effect the torque ripple and does not require knowledge of the D-Q reference system. However, Z-axis modulation is often limited in effect on the rotor, but may be used for coupling the stator to the rotor for either power or accessory information coupling (e.g., speed and/or position).

The frequency of current modulation, or current phasor oscillation, may be described by a duty cycle. This duty cycle may describe the operation divided between fluxing (e.g., D-axis) and torque producing (e.g., Q-axis) principal components. In startup conditions, the duty cycle may be 100%, or 75-100% or 40-100% on the D-axis for hard fluxing of the rotor before splitting operation between the D-axis and Q-axis for torque production where there may be a 50%-50% split, 30%-70%, 20-80%, 10-90% split (D-axis: Q-axis). This may also appear as an oscillation about a current phasor angle wherein the current phasor angle and resultant magnetic field vary about an angle by 5 degrees, 10 degrees, 20 degrees or, in some cases, 30-45 degrees during steady state or quasi-steady state operation. In some implementations, the frequency of oscillation or amplitude modulation can be varied to both elicit a rotor response and/or to limit torque ripple in operation.

Additionally, the control strategy may utilize higher frequency operation, or pulses, to limit the amount of flux that decays over time in the rotor coils. That is, by shortening the time step between the MMF cycles of the rotor (which decay over time), it is possible to decrease the variance of flux crossing the rotor coils to harden the flux and reduce any negative torque moments or associated torque ripple. Additional signal modification may be used, such as a skewed signal, trapezoidal, or pulse width modulation (PWM) techniques, to help flux the rotor, limit torque ripple and smoothen the transition between current phasor angles in operation.

Because stator-side currents may correspond to stator-side voltages, a scheme including signals embedded in currents may correspond to an equivalent scheme including signals embedded in voltages. Implementations described throughout this disclosure in reference to signals in stator-side voltages may be equivalent to, and may also describe signals in stator-side currents, and vice-versa.

As previously described, control of the rotor field can be manipulated by the controller through the stator windings using current phasor angle modulation. This modulation can be defined by a magnitude and a frequency and can be observed by the magnetic field of the machine, stator excitation, as well as the principal control components. Current phasor angle modulation can be used to transfer power to the AC coil, where oscillations in current angle are defined about a set operating point of current angle as defined by the D-Q reference frame (e.g., a current angle can be modulated to achieve a target torque per ampere, MTPA). Current phasor angle modulation perturbations can be defined by an oscillation of the excitation field, a magnitude, and a frequency. Current magnitude modulation at a given current phasor angle can be used to transfer power to, or induce a reaction within the rotor, where the greatest response can be seen at the current angle (in the D-Q reference frame of a given pole) of greatest coupling to the rotor. For instance, for a wound rotor that is aligned with the D-axis with respect to the synchronous reference frame axis, then the greatest power transfer would occur at a phasor current angle of 0° electrical (where 0° electrical is defined as the D-axis of the synchronous reference frame).

FIG. 7 is a block diagram of an example controller 700 that can be used with aspects of this disclosure. Controller 700 can be used in addition to or in lieu of motor controller 104 previously described. In the former instance, controller 700 and motor controller 104 can be combined into a single, integrated controller, or controller 700 and motor controller 104 can be separate, discrete controllers. The controller 700 can, among other things, monitor parameters of the electric machine (300, 400) and send signals to actuate and/or adjust various operating parameters of the electric machine (300, 400). As shown in FIG. 7, the controller 700, in certain instances, includes a processor 750 (e.g., implemented as one processor or multiple processors) and a memory 752 (e.g., implemented as one memory or multiple memories) containing instructions that cause the processors 750 to perform operations described herein. The processors 750 are coupled to an input/output (I/O) interface 754 for sending and receiving communications with components in the electric machine (300, 400), including, for example, a rotor position sensor or a current sensor. In certain instances, the controller 700 can additionally communicate status with and send actuation and/or control signals to one or more of the various electric machine components (including power or drive signals to the stator) of the electric machine (300, 400), as well as other sensors (e.g., temperature sensors, vibration sensors, and other types of sensors) provided in the electric machine (300, 400). The communications can be hardwired, wireless or a combination of wired and wireless. In some implementations, the controller 700 can be a distributed controller with different portions located within different locations, for example, different parts of a vehicle. Additional controllers can be used in conjunction with controller 700 as stand-alone controllers or networked controllers without departing from this disclosure.

The controller 700 can have varying levels of autonomy for controlling the electric machine (300, 400). For example, the controller 700 can begin sensing a change in load and/or speed, and an operator adjusts the power frequency, current magnitude, and/or current angle. Alternatively, the controller 700 can begin sensing a change in load and/or speed, receive an additional input from an operator, and adjust the frequency, current magnitude, and/or current angle with no other input from an operator. Alternatively, the controller 700 can begin sensing a change in load and/or speed and adjust the frequency, current magnitude, and/or current angle with no input from an operator. In general, the controller 700 is able receive a signal indicative of a desired operating point, receive a signal indicative of the current operating point, and is then able to adjust the frequency, current magnitude, and/or current angle in response to have the current operating point converge to the desired operating point.

For example, in operation, the controller can be a controller configured to energize the stator windings and produce the stator magnetic field within the stator by sending a control signal to the stator windings. The controller can be configured to produce the stator magnetic field by sending a current through the stator at a current angle and magnitude, and actively adjusting the current angle and magnitude depending upon operation conditions of the electric machine (300, 400). In some implementations, the phasor current angle 318 is increased ahead of the rotor pole (308, 408) in the direction of movement during high torque conditions. That is, in instances where greater current per torque unit is required can lead to an increased phasor current angle 318. In general, as the current phasor angle 318 increases, the rotor coils (310, 410) become more active (more current flowing through the coils) due to a lessened D-axis component 312. In other words, the field of each rotor winding decays faster as the current phasor angle 318 increases. The greater activity within the coils can lead to increased torque ripple without mitigation; however, a current amplitude can be increased during the increase the D-axis component experienced by each pole, counter acting the potential negative torque produced by the increased current angle 318. Alternatively or in addition, the phasor current angle 318 is decreased during high-speed, low torque operations. Alternatively or in addition, the current angle can become negative during braking operations. Regardless of the operating mode used, the controller 700 is capable of adjusting the current angle and/or the current amplitude to meet the present demands of the electric machine (300, 400) in a given situation.

In particular, current phasor angle or the current amplitude of a machine's principal components may be adjusted across operation to generate torque. In some instances, for example, when a rotor has a sufficient field strength, no magnetizing (or less) current may be applied when compared to previous time steps. In other instances, such as high speed operation, the rotor field may be allowed to degrade to reduce the back electromotive force (EMF) and provide voltage headroom, reduce cogging torque to limit torque ripple, and avoid active field weakening operation.

The controller is capable of communicating with the rotor, through the stator, at a wide range of frequencies, for example, between 50 and 1000 Hertz (Hz). In some implementations, the communication occurs between 100 and 1000 Hz. Regardless, the system is able to communicate changes faster than traditional systems. For example, a traditional squirrel-cage induction machine communicates at substantially 7 Hz. The ability for higher frequency transmission allows for the controller 700 to actively reduce torque ripple, regardless of operating condition, and to quickly adjust to changes in operating conditions.

Figure 8:
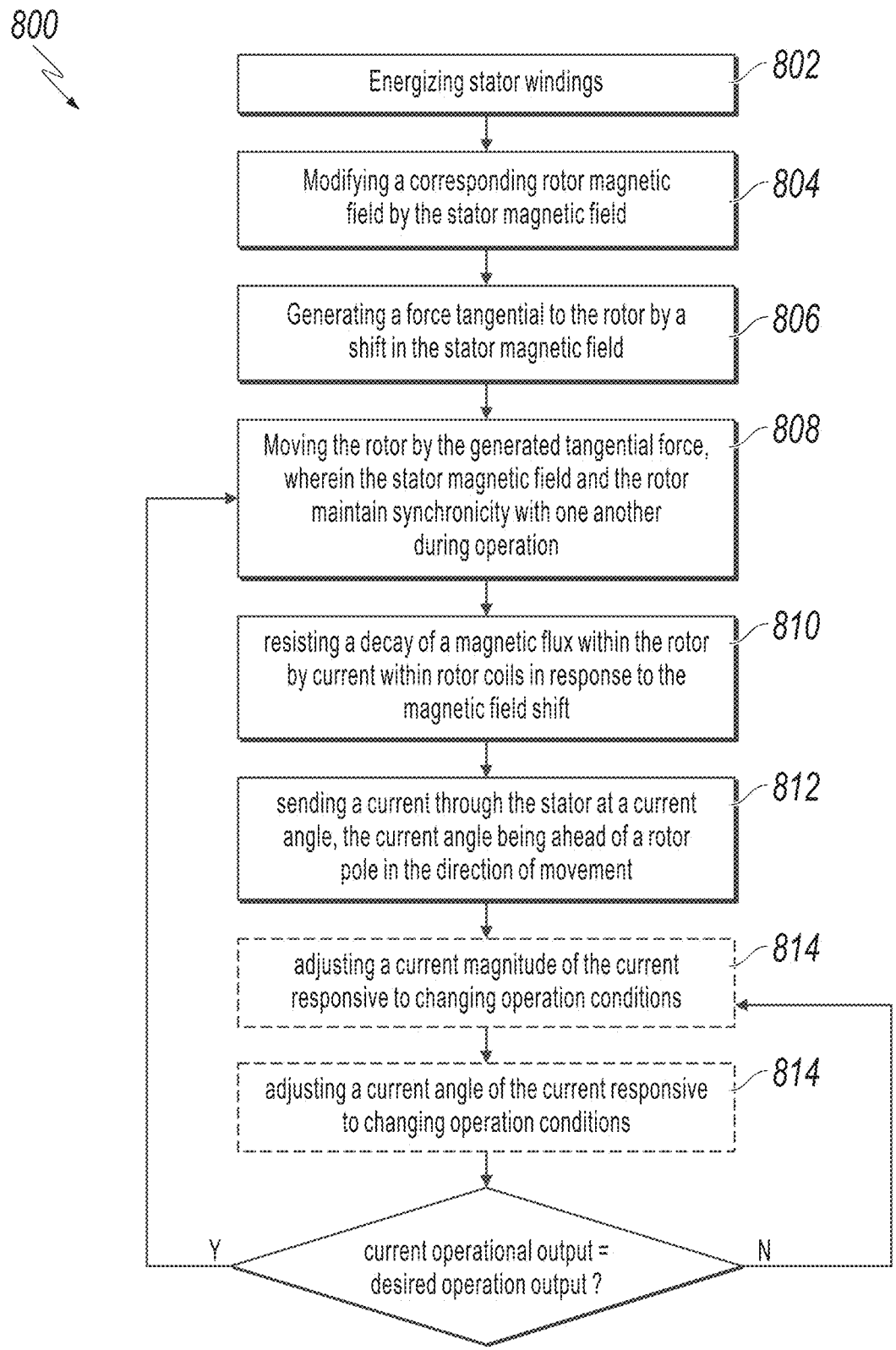
FIG. 8 is a flowchart of a method that can be used with aspects of this disclosure.

FIG. 8 is a flowchart of a method 800 that can be used with aspects of this disclosure. All or part of method 800 can be performed by the controller 700 and/or controller 104. At 802, the stator coils are energized. At 804, a corresponding rotor magnetic field, within ferromagnetic material within a rotor, is modified by the stator magnetic field. At 806, a force tangential to the rotor is generated by a shift in the stator magnetic field. At 808, the rotor is moved by the generated tangential force. The stator magnetic field and the rotor maintain synchronicity with one another during operation. At 810, a decay of a magnetic flux within the rotor is resisted by current within rotor coils in response to the magnetic field shift. At 812, a current is sent through the stator at a current angle. Typically, the current angle is ahead of a rotor pole in the direction of movement. In some instances, at 814, a current magnitude of the current is adjusted responsive to operating conditions. In some instances, at 816, a current angle relative to the rotor pole (the D-axis) is adjusted responsive to operating conditions. Notably, 814 and 816 are shown in dotted form because both steps are not required, nor required in that order. That is, current magnitude and current angle may be independently adjusted separately from one another.

Thereafter, the operational output of the electric machine at the current time is compared to the desired operational output of the electric machine. If the operational output of the electric machine at the current time is at the desired operational output of the electric machine, the machine continues operating using the most-recently adjusted parameters of stator current. If not, the process iterates back to adjust at least one of the current magnitude or the current angle of the stator current until the operational output of the electric machine at the current time is at the desired operational output of the electric machine.

Figure 9A:
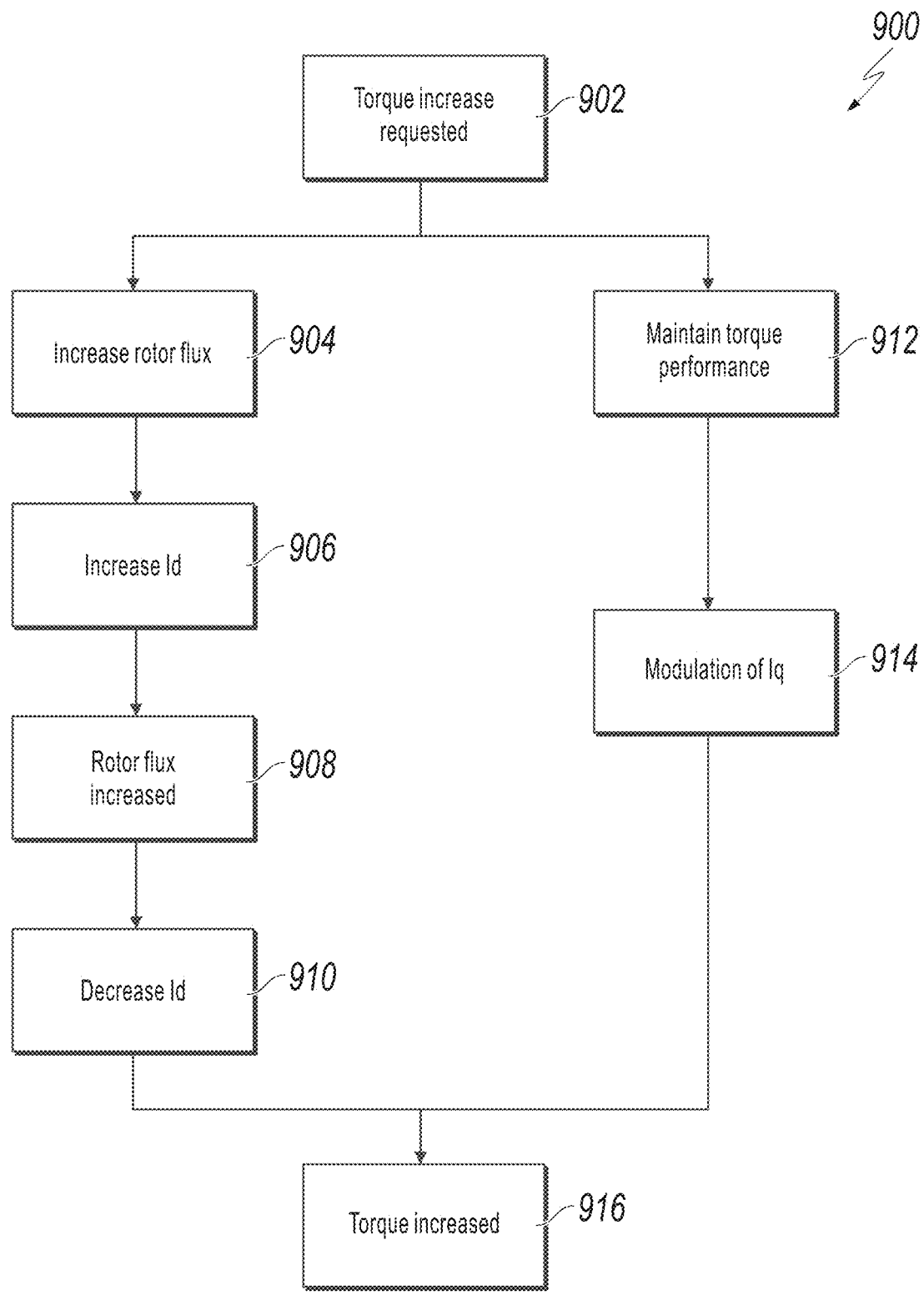
FIG. 9A is a flowchart of a method for responding to a torque increase request in accordance with an aspect of this disclosure.

Referring now to FIG. 9A, one non-limiting example of a process control in accordance with the present disclosure is provided. In particular, FIG. 9A provides an example flowchart for controlling a motor system in accordance with the present disclosure to deliver increased torque 900. The process 900 begins with a demand or request for increased torque at 902. In accordance with the present disclosure, meeting this request can be conceptualized as performing two parallel workflows. However, in practice, the controller need not be programmed or designed to operate with independent, parallel, or otherwise distinct flows. To meet the request for increased torque 902, the controller determines that achieving the increased torque can be done by increasing rotor flux at 904. This to do so $I_d$ is increased at 906, which increases the rotor flux at 908. This continues until the desired rotor torque is achieved and then $I_d$ is decreased at 910. However, while seeking to increase rotor flux, the controller recognizes a Q-axis current modulation can be used, or varied alongside a D-axis current modulation, with the goal of controlling or minimizing torque ripple. Thus, the controller also works to maintain torque performance at 912. To this end, the controller also modulates $I_q$ at 914 to, thereby, yield the desired torque increase at 916, but without the ill effects of instable torque performance, such as can be caused by torque ripples.

Figure 9B:
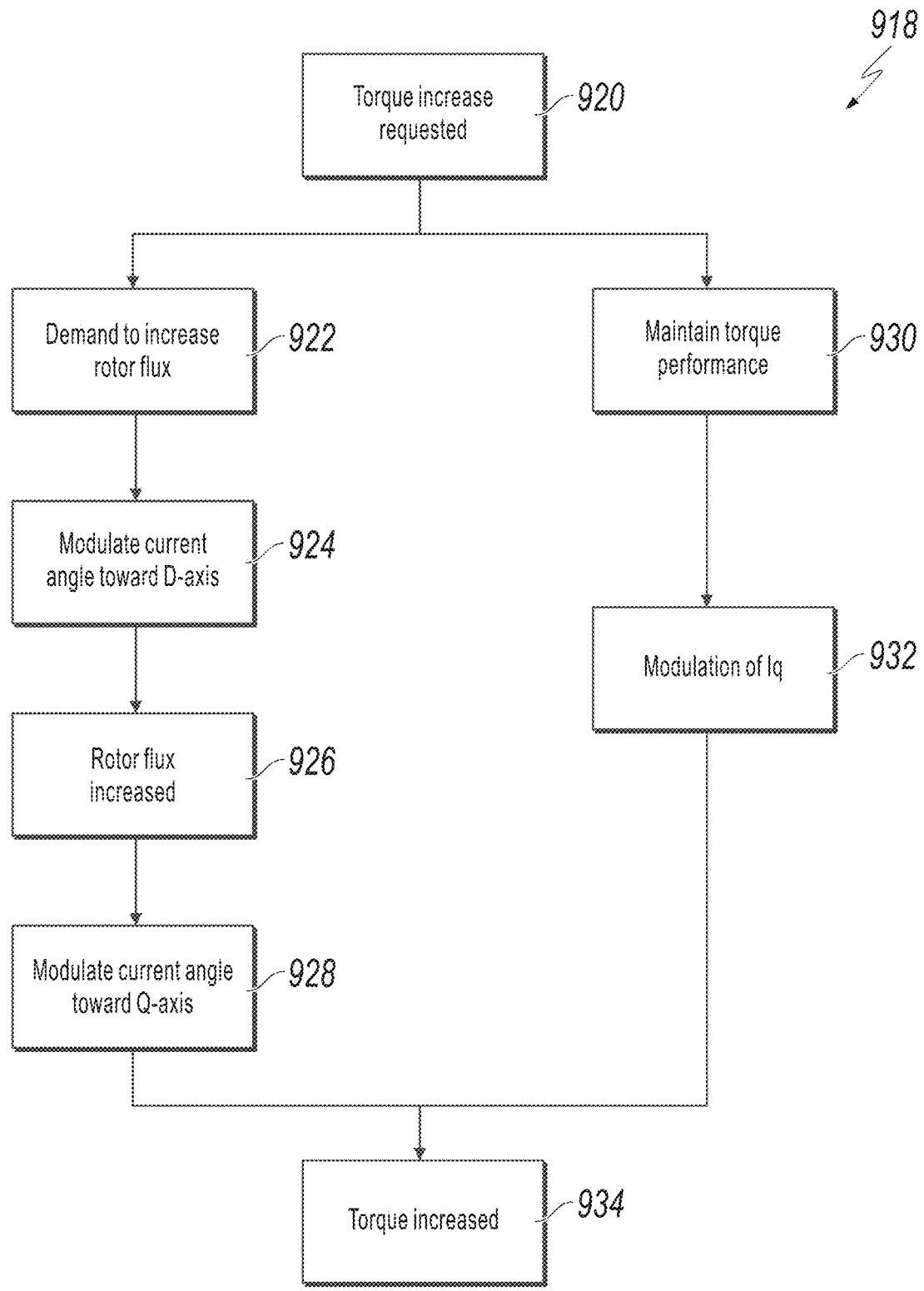
FIG. 9B is another flowchart of a method for responding to a torque increase request in accordance with an aspect of this disclosure.

Referring now to FIG. 9B, another non-limiting example of a control process 918 for responding to a request for increased torque at 920 is provided. In response to the request at 920, the controller determines that achieving the increased torque can be achieved by demanding an increase in rotor flux at 922. To achieve this, the controller seeks to modulate the current angle toward the D-axis at 924, because this will readily increase the rotor flux at 924, which is further controlled by modulating the current angle toward the Q-axis at 928. In parallel, the controller works to maintain torque performance at 930 by modulating $I_q$, such as described above. Thus, as a result, the requested torque increase is delivered at 934.

Figure 9C:
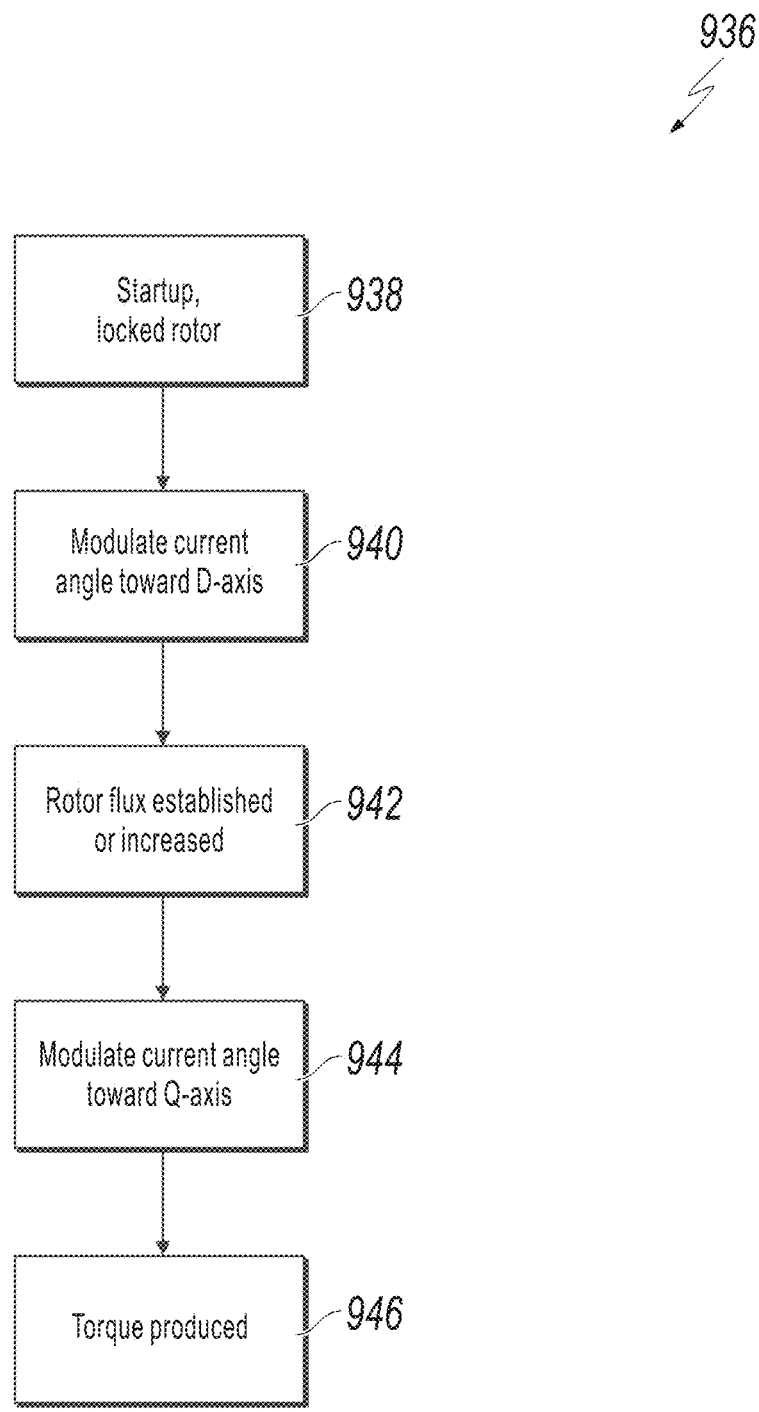
FIG. 9C is a flowchart of a method for starting a motor in accordance with an aspect of this disclosure.

Referring now to FIG. 9C, another non-limiting example of a control process for reaching a desired torque form startup is provided at 936. At 938, at startup, the rotor is locked. To begin rotation, at 940, the current angle is modulated toward the D-axis and, at 942, rotor flux is established or increased as the rotor moves toward the D-axis. At 944, the current angle is modulated toward the Q-axis and this process continues until the desired torque is produced at 946.

Figure 9D:
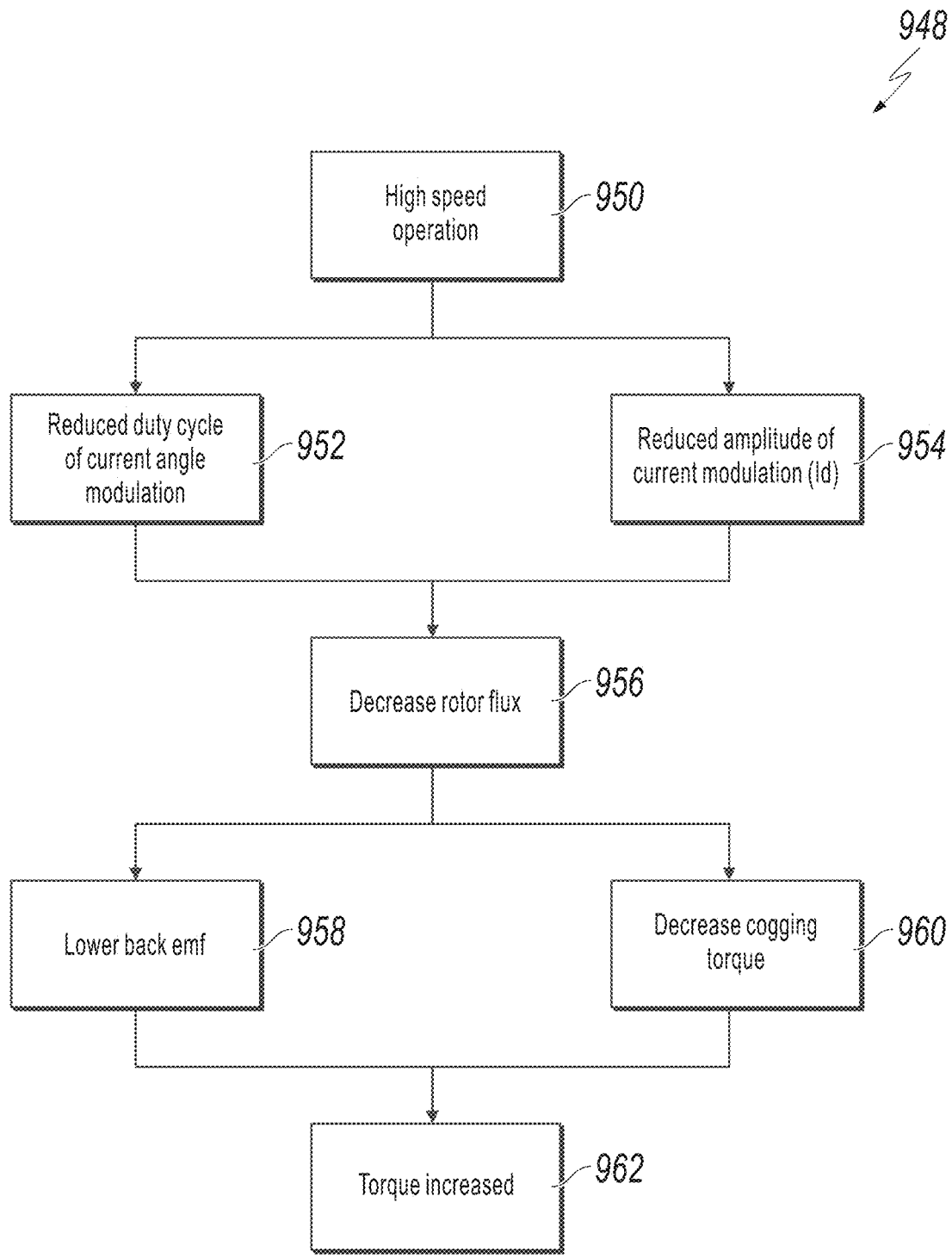
FIG. 9D is a flowchart of a method for responding to a torque increase request in accordance with an aspect of this disclosure.

FIG. 9D provides still another non-limiting example of a control process for reaching a desired torque at 948. In this case, the process starts with the motor already in high-speed operation 950. At 952, the duty cycle of the current angle modulation is reduced and at 954, the amplitude of the current modulation is reduced. As a result, the rotor flux is decreased at 956. At 958, the back EMF drops and the cogging torque decreases at 960, as the rotor flux decreases. Given the motor's high speed of operation at 950, this control ultimately yields an increase in torque at 962.

Thus, the described systems and method were shown to develop a net increase in torque through sinusoidal excitation due to asymmetric flux vectoring of the rotor field lines along stator D-axis resulting in net rotor field D-Axis current injection. As a result, net D-Axis current injection was capable in traditional circuits with analog circuitry. A machine with the rotor coil structures will saturate less, presenting a net benefit of shorted coil in terms of mean torque generation. The net D-Axis current injection enables greater sheet current density under equivalent stator excitation due to the reactive rotor coil currents.

Figure 10:
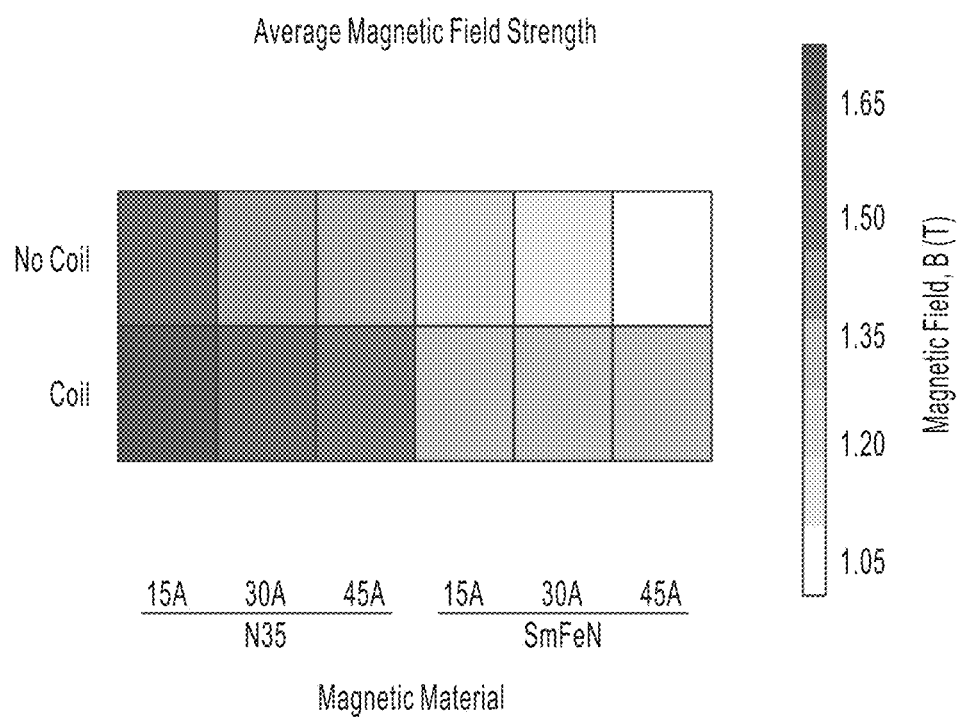
FIG. 10 is a graph of average magnetic field strength for various machine configurations.

As shown in FIG. 10, a graph of average magnetic field strength is provided for three different interior permanent magnet machines. In the first machine no coils are included. In the second, the machine includes shorted coils. As clearly shown in FIG. 10, the magnetic field strengths increase for the machine with the coil structures compared to the machine with no coil.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A wound field rotor synchronous machine, comprising:
   a stator defining multiple stator poles with associated stator windings;
   a rotor defining multiple rotor poles, the rotor configured to rotate synchronously with the stator, the rotor comprising rotor windings associated with each of the rotor poles, the rotor windings configured to be energized by a magnetic field produced by the stator windings, wherein the energized rotor windings produce a rotor field; and a controller configured to:

energize the stator windings with a stator current having a magnitude and a phase angle measured relative to a closest one of the rotor poles; and achieve a target operational output of the wound field rotor synchronous machine by:

determining a rotor performance that achieves the target operational output of the wound field rotor synchronous machine;

adjusting a first one of the phase angle of the stator current or the magnitude of the stator current to achieve the target operational output of the wound field rotor synchronous machine;

receiving a signal indicative of a current operational output of the wound field rotor synchronous machine;

comparing the current operational output of the wound field rotor synchronous machine to the target operational output of the wound field rotor synchronous machine; and adjusting a second one of the phase angle of the stator current or the magnitude of the stator current to achieve the target operational output of the wound field rotor synchronous machine.

2. The wound field rotor synchronous machine of claim 1, wherein the controller is further configured to modulate a frequency of the stator current responsive to the target operational output of the wound field rotor synchronous machine.

3. The wound field rotor synchronous machine of claim 1, wherein the controller is further configured to adjust the phase angle on only one axis of the wound field rotor synchronous machine.

4. The wound field rotor synchronous machine of claim 3, wherein the one axis comprises one of a D-axis or a Q-axis of the wound field rotor synchronous machine.

5. The wound field rotor synchronous machine of claim 4, wherein the controller is further configured to:

determine a target rotor motion corresponding to the target operational output of the wound field rotor synchronous machine;

modulate current on the D-axis to control rotor torque ripple while the rotor is performing the target rotor motion; and achieve the target operational output of the wound field rotor synchronous machine.

6. The wound field rotor synchronous machine of claim 1, wherein the controller is further configured to select adjustments to at least one of the phase angle or the magnitude to control rotor torque ripple while achieving the target operational output of the wound field rotor synchronous machine.

7. The wound field rotor synchronous machine of claim 1, wherein the controller is configured to adjust the magnitude of the stator current independent from the phase angle of the stator current based on the target operational output of the wound field rotor synchronous machine.

8. The wound field rotor synchronous machine of claim 1, wherein the controller is further configured to:

determine a target rotor motion corresponding to the target operational output of the wound field rotor synchronous machine.

9. The wound field rotor synchronous machine of claim 8, wherein the controller is configured to:

calculate a vector control modulation applied to the stator that elicits the target rotor motion; and adjust the phase angle of the stator current based on the vector control modulation to cause the rotor to perform the target rotor motion and achieve the target operational output of the wound field rotor synchronous machine.

10. The wound field rotor synchronous machine of claim 9, wherein the controller is further configured to:

modulate at least one of the magnitude or a frequency of the stator current based on the vector control modulation.

11. The wound field rotor synchronous machine of claim 8, wherein the controller is further configured to:

adjust at least one of a frequency or the magnitude of the stator current to cause the rotor to perform the target rotor motion; and achieve the target operational output of the wound field rotor synchronous machine or control rotor torque ripple when the rotor is performing the target rotor motion and achieve the target operational output of the wound field rotor synchronous machine.

12. The wound field rotor synchronous machine of claim 1, wherein the controller is further configured to:

increase the phase angle of the stator current along a winding of the stator ahead of a pole of a rotor to deliver an increased torque to achieve the target operational output of the wound field rotor synchronous machine.

13. The wound field rotor synchronous machine of claim 12, wherein the controller is further configured to:

increase the magnitude of the stator current while simultaneously increasing the phase angle of the stator current to control rotor torque ripple.

14. The wound field rotor synchronous machine of claim 1, wherein the controller is further configured to:

increase the phase angle of the stator current to deliver a decreased torque with an increased speed of the rotor to achieve the target operational output of the wound field rotor synchronous machine.

15. The wound field rotor synchronous machine of claim 1, wherein the controller is further configured to:

cause the phase angle of the stator current to be negative to deliver a braking function of the rotor to achieve the target operational output of the wound field rotor synchronous machine.

16. The wound field rotor synchronous machine of claim 1, wherein the controller is further configured to:

send the stator current through the stator at the phase angle, wherein the phase angle is ahead of a rotor pole in a direction of movement or measured from a closet one of the rotor poles.

17. The wound field rotor synchronous machine of claim 1, wherein the controller is further configured to:

produce a stator magnetic field within the stator by the energized stator windings;

produce a corresponding rotor magnetic field within a ferromagnetic material within a rotor of the wound field rotor synchronous machine by the stator magnetic field;

generate a force tangential to the rotor by a shift in the stator magnetic field;

move the rotor by the generated force tangential to the rotor; and resist a decay of a magnetic flux within the rotor by current within rotor coils in response to the shift in the stator magnetic field.

18. The wound field rotor synchronous machine of claim 1, wherein the stator windings comprise distributed windings, and
wherein the rotor comprises: concentrated windings, salient windings, non-overlapping windings, or permanent magnets.

19. The wound field rotor synchronous machine of claim 18, wherein the rotor comprises permanent magnets, and the permanent magnets are substantially aligned with the rotor poles.

20. A method of controlling a wound field rotor synchronous machine, the method comprising:
energizing stator windings of a stator with a stator current having a magnitude and a phase angle measured relative to a closest one of rotor poles of a rotor, wherein the rotor is maintained in synchronicity with a stator magnetic field produced by the stator during operation of the wound field rotor synchronous machine; and
achieving a target operational output of the wound field rotor synchronous machine by:
determining a rotor performance that achieves the target operational output of the wound field rotor synchronous machine;
adjusting a first one of the phase angle of the stator current or the magnitude of the stator current to achieve the target operational output of the wound field rotor synchronous machine;
receiving a signal indicative of a current operational output of the wound field rotor synchronous machine;
comparing the current operational output of the wound field rotor synchronous machine to the target operational output of the wound field rotor synchronous machine; and
adjusting a second one of the phase angle of the stator current or the magnitude of
the stator current to achieve the target operational output of the wound field rotor synchronous machine.

* * * * *